United States Patent
Yun

(10) Patent No.: US 11,887,107 B2
(45) Date of Patent: Jan. 30, 2024

(54) METHOD AND DEVICE FOR PROVIDING TRANSACTION SERVICE FOR CRYPTOCURRENCIES BASED ON DIFFERENT BLOCKCHAINS

(71) Applicant: NEXON KOREA CORPORATION, Seongnam-si (KR)

(72) Inventor: Seok Ju Yun, Seongnam-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 196 days.

(21) Appl. No.: 17/045,419

(22) PCT Filed: May 8, 2018

(86) PCT No.: PCT/KR2018/005252
§ 371 (c)(1),
(2) Date: Oct. 5, 2020

(87) PCT Pub. No.: WO2019/198866
PCT Pub. Date: Oct. 17, 2019

(65) Prior Publication Data
US 2021/0150512 A1 May 20, 2021

(30) Foreign Application Priority Data
Apr. 13, 2018 (KR) .......................... 10-2018-0043464

(51) Int. Cl.
*G06Q 20/36* (2012.01)
*G06Q 20/38* (2012.01)
(Continued)

(52) U.S. Cl.
CPC ..... *G06Q 20/3678* (2013.01); *G06Q 20/0658* (2013.01); *G06Q 20/3674* (2013.01);
(Continued)

(58) Field of Classification Search
CPC ........... G06Q 20/3678; G06Q 20/0658; G06Q 20/3674; G06Q 20/381; G06Q 20/3825;
(Continued)

(56) References Cited

U.S. PATENT DOCUMENTS

2011/0082767 A1* 4/2011 Ryu .................... H04L 63/0838
726/28
2015/0363769 A1* 12/2015 Ronca .................. G06Q 20/381
705/64
(Continued)

FOREIGN PATENT DOCUMENTS

CN 107742210 A * 2/2018
JP 5858507 B1 2/2016
(Continued)

OTHER PUBLICATIONS

"Anticipating the Economic Benefits of Blockchain", Melanie Swan, Technology Innovation Management Review, Oct. 2017, vol. 7, Issue 10 (Year: 2017).*
(Continued)

*Primary Examiner* — Duan Zhang
(74) *Attorney, Agent, or Firm* — KILPATRICK TOWNSEND & STOCKTON LLP

(57) ABSTRACT

A method of transaction between a first cryptocurrency transacted based on a first blockchain and a second cryptocurrency transacted based on a second blockchain includes obtaining first transaction information with respect to a first transaction in which a first user transmits the first cryptocurrency to a second user, and second transaction information with respect to a second transaction accompanying the first transaction and in which the first user receives the second cryptocurrency from the second user; if the first transaction information satisfies terms of agreement between the first user and the second user, adding, to the first transaction information, first condition information depend-
(Continued)

ing on validity of the second transaction information and activating the first transaction of the first cryptocurrency; and digitally signing the first transaction information to which the first condition information is added, to prove the terms of agreement, and transmitting the first transaction information to a node on a network of the first blockchain.

13 Claims, 12 Drawing Sheets

(51) Int. Cl.
  *G06Q 20/40* (2012.01)
  *H04L 9/06* (2006.01)
  *G06Q 20/06* (2012.01)
  *H04L 9/00* (2022.01)

(52) U.S. Cl.
  CPC ....... *G06Q 20/381* (2013.01); *G06Q 20/3825* (2013.01); *G06Q 20/3829* (2013.01); *G06Q 20/405* (2013.01); *H04L 9/0643* (2013.01); *H04L 9/50* (2022.05)

(58) Field of Classification Search
  CPC ............. G06Q 20/3829; G06Q 20/405; G06Q 20/0655; G06Q 20/3223; G06Q 20/065; G06Q 20/3827; H04L 9/0643; H04L 9/50; H04L 2209/56; H04L 9/3239; H04L 9/3247; H04L 9/3297
  See application file for complete search history.

(56) References Cited

U.S. PATENT DOCUMENTS

| | | | | |
|---|---|---|---|---|
| 2016/0342978 | A1* | 11/2016 | Davis | G06Q 20/0655 |
| 2019/0034936 | A1* | 1/2019 | Nolan | G06Q 20/3829 |
| 2019/0156301 | A1* | 5/2019 | Bentov | H04L 9/0897 |
| 2019/0287100 | A1* | 9/2019 | Song | G06Q 20/389 |

FOREIGN PATENT DOCUMENTS

| | | |
|---|---|---|
| KR | 10-1591244 B1 | 2/2016 |
| KR | 10-1628007 B1 | 6/2016 |
| KR | 10-1660627 B1 | 9/2016 |
| KR | 2018-0010467 A | 1/2018 |
| WO | 2018-060951 A1 | 4/2018 |

OTHER PUBLICATIONS

"Bithumb Cash, Mobile Bithumb Cash Remittance Manual", Bithumb, (n.d.), retrieved from https://www.bithumb.com, 31 pages. English translation attached.

International Search Report and Written Opinion dated Jan. 11, 2019 in International Patent Application No. PCT/KR2018/005252, filed May 8, 2018, 13 pages.

"Bithumb Cash, Mobile Bithumb Cash Remittance Manual", Bithumb, (n.d.), retrieved from https://www.bithumb.com, 11 pages.

Coin Information Collection, Naver blog, "What is a mainnet? What is atomic swap? Let's get to know the two," ico-korea.com, Feb. 21, 2018, all pages. https://m.blog.naver.com/PostView.naver?isHttpsRedirect=true&blogid-goyard031&logNo=221213078785.

MoneyNetStaff, "Atomic swap concept and features," URL: https://www.moneynet.co.kr/board_lecture/100490, Sep. 19 2017, all pages.

* cited by examiner

METHOD AND DEVICE FOR PROVIDING TRANSACTION SERVICE FOR CRYPTOCURRENCIES BASED ON DIFFERENT BLOCKCHAINS

TECHNICAL FIELD

The present disclosure relates to a device and method for providing a transaction service of cryptocurrency based on blockchain.

BACKGROUND ART

Recently, cryptocurrency using various forms of cryptography has been attracting attention. In addition to bitcoin, which was the first in 2009 and the largest, there are litecoin, peercoin and namecoin. In January 2009, Bitcoin, developed by a writer named Satomi Nakamoto, is not a currency used in real life, but a virtual currency used in online transactions. Bitcoin is known to have created by an unidentified person named Nakamoto Satoshi in 2008 as a counter-reaction against the monetary policy of monopoly and arbitrary monetary policy by the central banks of each country. The MIT license was released as an open-source version of a computer that offers a bitcoin in exchange for a very difficult mathematical problem. Like Linux, which is a computer operating system (OS), bitcoin is also open to programming schematics, so any developer may participate in programming upgrades.

With the emergence of various cryptocurrencies, technologies necessary for efficiently transacting different types of cryptocurrencies are required.

DESCRIPTION OF EMBODIMENTS

Technical Problem

In a transaction that exchanges different types of cryptocurrencies between the parties, it aims to increase the stability and efficiency of the transaction.

Solution to Problem

Provided is a method of transaction between a first cryptocurrency transacted based on a first blockchain and a second cryptocurrency transacted based on a second blockchain. The method includes obtaining first transaction information with respect to a first transaction in which a first user transmits the first cryptocurrency to a second user, and second transaction information with respect to a second transaction accompanying the first transaction and in which the first user receives the second cryptocurrency from the second user; if the first transaction information satisfies terms of agreement between the first user and the second user, adding first condition information depending on a validity of the second transaction information and activating the first transaction of the first cryptocurrency to the first transaction information; and digitally signing the first transaction information to which the first condition information is added to prove the terms of agreement, and transmitting the first transaction information to a node on a network of the first blockchain.

Advantageous Effects of Disclosure

Even if there is no third party (for example, an exchange, etc.) between the parties transacting cryptocurrency, the transaction of cryptocurrency between the parties may be efficiently performed.

In addition, in transactions of exchanging different kinds of cryptocurrencies, transactions are made without mediation of a third party, and thus the stability and efficiency of transactions may increase.

BRIEF DESCRIPTION OF DRAWINGS

The present disclosure may be easily understood by the following detailed description and combinations of the accompanying drawings, and reference numerals refer to structural elements.

BEST MODE

Figure 1:
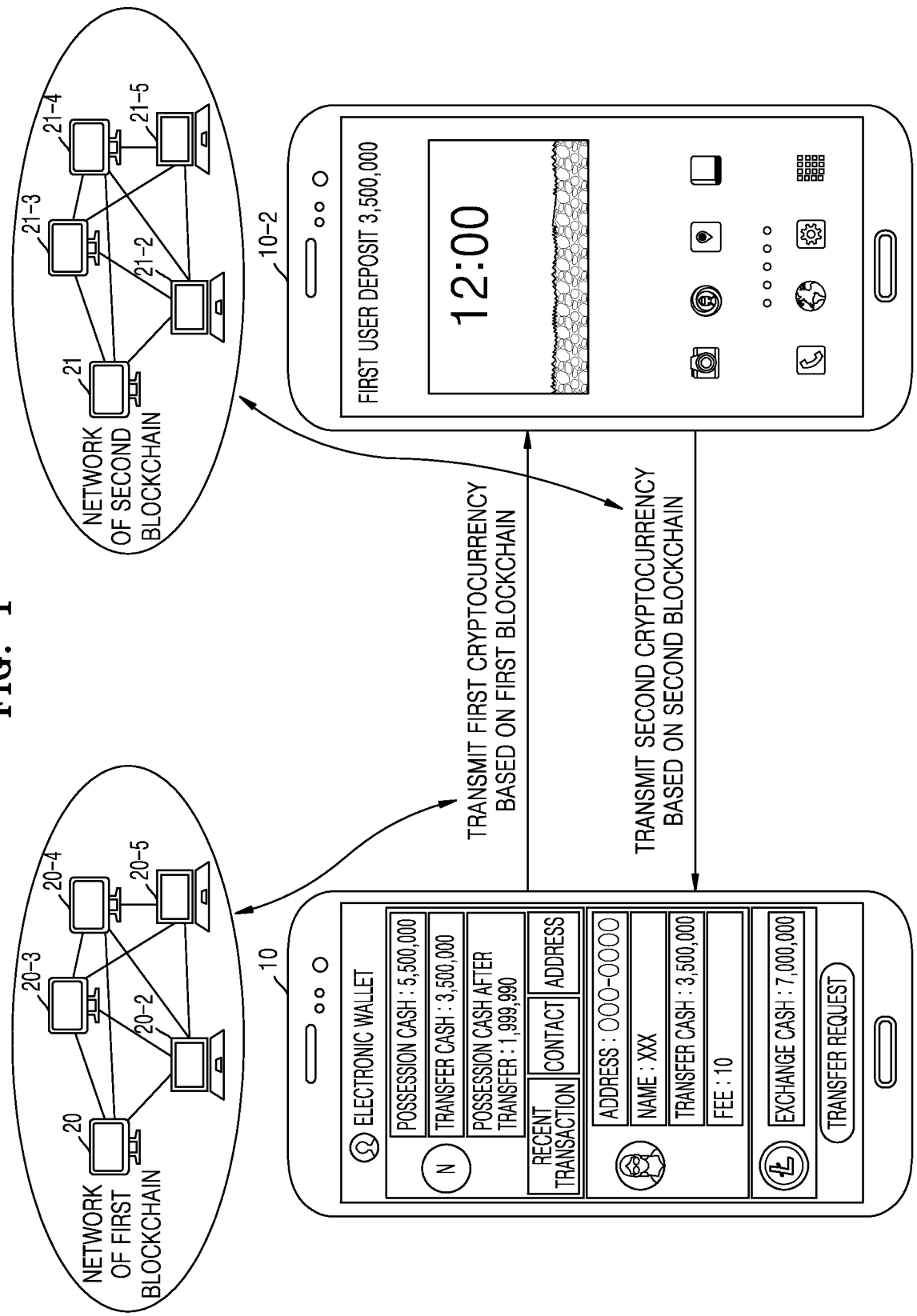
FIG. 1 is a conceptual diagram illustrating a method of transacting cryptocurrency between terminals based on different kinds of blockchain according to an embodiment.

According to an aspect of the present disclosure, a method of transaction between a first cryptocurrency transacted based on a first blockchain and a second cryptocurrency transacted based on a second blockchain includes obtaining first transaction information with respect to a first transaction in which a first user transmits the first cryptocurrency to a second user, and second transaction information with respect to a second transaction accompanying the first transaction and in which the first user receives the second cryptocurrency from the second user; if the first transaction information satisfies terms of agreement between the first user and the second user, adding first condition information depending on a validity of the second transaction information and activating the first transaction of the first cryptocurrency to the first transaction information; and digitally signing the first transaction information to which the first condition information is added, to prove the terms of agreement, and transmitting the first transaction information to a node on a network of the first blockchain.

According to another aspect of the present disclosure, a method of operation of a first node on a network of a first blockchain includes receiving first transaction information with respect to a first transaction in which a first user transmits a first cryptocurrency to a second user, and first condition information depending on a validity of second transaction information with respect to a second cryptocurrency based on a second blockchain and activating the first transaction from a terminal of the first user; if the first transaction information is valid according to verification of a validity of the first transaction information, transmitting the first transaction information to a second node on the network of the first blockchain and adding the first transaction information to a candidate block; performing proof of work on the candidate block, and adding the candidate block to the first blockchain as a first valid block; and if the first condition information is satisfied, activating the first transaction.

According to another aspect of the present disclosure, a terminal includes a communication device; a processor; a user interface device; and a memory storing instructions executable by the processor, wherein the processor is configured to, by executing the instructions, obtain first transaction information with respect to a first transaction in which a first user transmits the first cryptocurrency to a second user, and second transaction information with respect to a second transaction accompanying the first transaction and in which the first user transmits the second cryptocurrency from the second user; if the first transaction information satisfies terms of agreement between the first user and the second user, add first condition information depending on a validity of the second transaction information and activating the first transaction of the first cryptocurrency to the first transaction information; and digital sign the first transaction information to which the first condition information is added, to prove the terms of agreement, and transmit the first transaction information to a node on a network of the first blockchain.

MODE OF DISCLOSURE

Hereinafter, various embodiments will be described in detail with reference to the accompanying drawings. The embodiments described hereinafter may be embodied in many different forms. To more clearly describe the features of the embodiments, a detailed description of known matters to those skilled in the art to which the embodiments belong will be omitted.

Meanwhile, in the specification, when it is described that an element is "connected" to another element, the element may be "directly connected" to the other element or "connected" to the other element through a third element. In addition, unless explicitly described to the contrary, the word "comprise" and variations such as "comprises" or "comprising", will be understood to imply the inclusion of stated elements but not the exclusion of any other elements.

As used herein, terms including ordinals such as 'first' or 'second' may be used to describe various elements, but the elements should not be limited by the terms. The terms are only used for the purpose of distinguishing one element from another.

In the present specification, "blockchain" may refer to a distributed Peer to Peer (P2P) system of a ledger that utilizes a software element composed of algorithms in which blocks connected in order negotiate transaction information using encryption and security techniques so as to secure and maintain integrity. Here, the distributed P2P system may be a special form of a distributed system. In addition, in the P2P system, all nodes of the network may provide resources (processing power, storage space, data or network bandwidth, etc.) to each other without coordination of a central node. In addition, a "blockchain" may mean a distributed ledger technology that nodes in a network jointly record and manage by distributing the ledger recording transaction information to a P2P network rather than a central server of a specific institution.

In the present specification, "cryptocurrency" may mean a digital currency designed to be used as an exchange means using an encryption method. In addition, the "cryptocurrency" may use the encryption method to ensure the security of transactions, control the creation of additional units, and authenticate the transfer of assets.

In the present specification, a "hash function" may mean a function that converts any type of data into a fixed-length number regardless of the length of input data. The hash function may calculate a hash value using bits and bytes constituting the input data.

In the present specification, a "terminal" may be a smart phone, a tablet PC, a PC, a TV, a smart TV, a mobile phone, a personal digital assistant (PDA), a laptop, or a non-mobile computing device, but is not limited thereto.

In the present specification, a "node" may mean a component within a network of blockchain. For example, the node may be a special-purpose computer, a general-purpose computer, a supercomputer, a mainframe computer, a personal computer, a smartphone, and a tablet PC, etc., but is not limited thereto.

In the present specification, an "electronic wallet" may refer to means storing values in an electronic way on an electronic device and enabling transactions online or offline without exchanging real money. In addition, the "electronic wallet" is a kind of an electronic payment system used in electronic commerce and may refer to software that stores the money value in a memory of the electronic device or a virtual account and uses as a wallet while settling payment upon the electronic commerce.

FIG. 1 is a conceptual diagram illustrating a method of transacting cryptocurrency between terminals based on different kinds of blockchains according to an embodiment.

A terminal 10 of a first user may execute the electronic wallet of a first user managing cryptocurrency according to an input of the first user. The terminal 10 of the first user may perform a transaction of cryptocurrency based on transaction information used by the first user to transfer a predetermined cryptocurrency to a second user.

Meanwhile, a first cryptocurrency may be transacted based on a first blockchain. In the first blockchain, transaction information of the first cryptocurrency of users is recorded and stored. Meanwhile, a second cryptocurrency may be transacted based on a second blockchain. In the second blockchain, transaction information of the second cryptocurrency of users is recorded and stored. That is, different cryptocurrencies may be transacted based on different blockchains.

The first user may perform transactions of exchanging the first cryptocurrency and the second cryptocurrency with the second user. That is, the first user and the second user may agree on a first transaction in which the first user transfers the predetermined first cryptocurrency to the second user, and a second transaction in which the second user transfers the predetermined second cryptocurrency corresponding to the predetermined first cryptocurrency to the first user.

The terminal 10 of the first user may transfer the first cryptocurrency from an electronic wallet of the first user to an electronic wallet of the second user, and transmit first transaction information to a first node 20 among nodes 20, 20-2, 20-3, 20-4, and 20-5 on a network of the first blockchain so as to record transfer details. In this case, in order to guarantee the second transaction, the terminal 10 of the first user may add first condition information depending on the validity of second transaction information and activating the transaction of the first cryptocurrency to the first transaction information.

Similarly, a terminal 10-2 of the second user may transfer the second cryptocurrency from the electronic wallet of the second user to the electronic wallet of the first user, and transmit the second transaction information to a second node 21 among nodes 21, 21-2, 21-3, 21-4, and 21-5 on a network of the second blockchain so as to record transfer details. In this case, in order to guarantee the first transaction, the terminal 10-2 of the second user may add second condition information depending on the validity of first transaction information and activating the transaction of the second cryptocurrency to the second transaction information.

Figure 2:
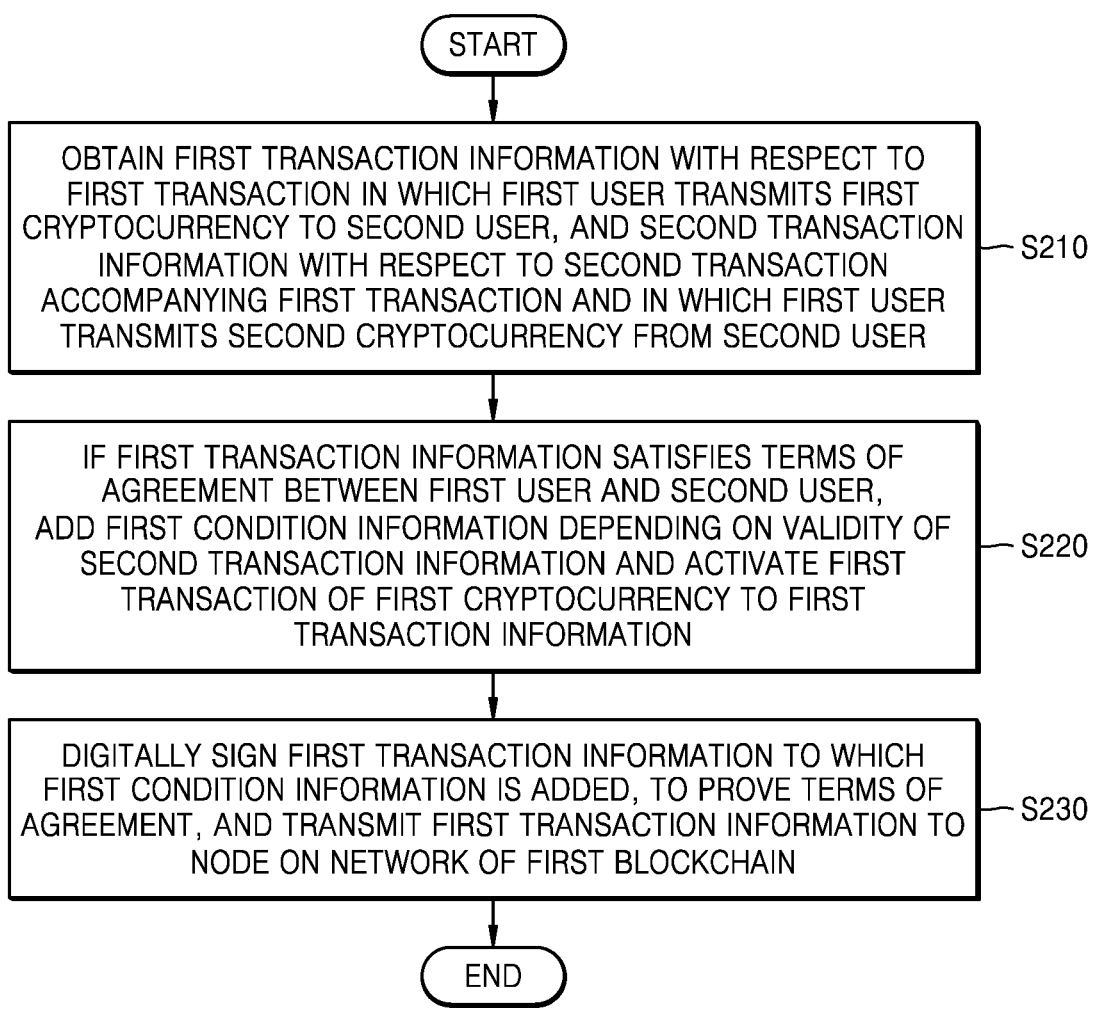
FIG. 2 is a flowchart illustrating a method of transacting cryptocurrency in a terminal based on different kinds of blockchain according to an embodiment.
Figure 13:
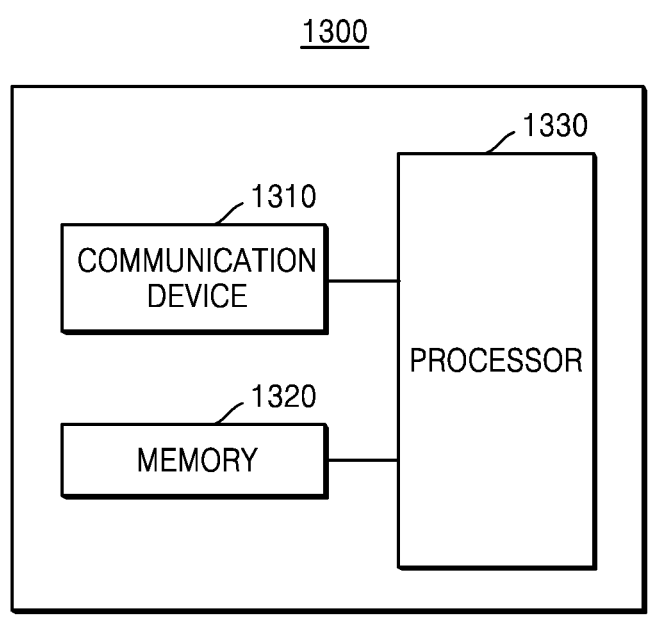
FIG. 13 is a block diagram illustrating the configuration of a node on a network of blockchain according to an embodiment.

FIGS. 2 and 13 illustrate a transaction method between the first cryptocurrency transacted based on the first blockchain and the second cryptocurrency transacted based on the second blockchain.

FIG. 2 is a flowchart illustrating a method of transacting cryptocurrency in a terminal based on different kinds of blockchains according to an embodiment. Hereinafter, the terminal 10 may mean a terminal of a first user.

In operation S210, the terminal 10 may obtain first transaction information with respect to first transaction in which the first user transmits a first cryptocurrency to a second user. For example, the terminal 10 may receive the first transaction information from the terminal 10-2 of the second user. In addition, the terminal 10 may obtain second transaction information with respect to second transaction accompanying the first transaction. Here, the second transaction information may be information about the second transaction in which the first user receives a second cryptocurrency from the second user.

Here, each of the first transaction information and the second transaction information may include information about at least one of an address of an electronic wallet of a recipient to receive a predetermined cryptocurrency, an address of an electronic wallet of a transmitter to transmit the predetermined cryptocurrency, a transfer amount of the predetermined cryptocurrency, and a fee for the transfer of the predetermined cryptocurrency, but is not limited thereto.

In addition, the terminal 10 may determine whether the first transaction of the first cryptocurrency and the second transaction of the second cryptocurrency are suitable based on a predetermined exchange ratio of the first cryptocurrency and the second cryptocurrency. If the first transaction and the second transaction are not suitable, the terminal 10 may automatically correct the transfer amount of the first cryptocurrency or the transfer amount of the second cryptocurrency based on the predetermined exchange ratio of the first cryptocurrency and the second cryptocurrency. In addition, the terminal 10 may correct the transfer amount of the first cryptocurrency or the transfer amount of the second cryptocurrency based on a user input.

In addition, the terminal 10 may transmit the second transaction information with respect to the second transaction accompanying the first transaction to the terminal 10-2 of the second user.

In operation S220, if the first transaction information satisfies terms of condition between the first user and the second user, the terminal 10 may add first condition information depending on the validity of the second transaction information and activating the first transaction of the first cryptocurrency to the first transaction information.

Here, the first condition information may be condition information for activating the first transaction according to the first transaction information recorded on a block connected to a first blockchain if a block recording the second transaction information is added to a second blockchain as a valid block.

In addition, the first condition information may be condition information for invalidating the first transaction if the second transaction information is transmitted to the terminal 10-2 of the second user, and, after a predetermined period of time, the block recording the second transaction information is not added to the second blockchain as the valid block.

Also, the first condition information may be condition information for deactivating the first transaction until the block recording the second transaction information is added to the second blockchain as the valid block.

In operation S230, the terminal 10 may digital sign the first transaction information to which the first condition information is added, to prove the terms of condition, and transmit the first transaction information to a node on the network of the first blockchain.

For example, the terminal 10 may calculate a first hash value by applying a hash function to the first transaction information to which the first condition information is added. The terminal 10 may generate a first cryptogram indicating the digital signature of the first transaction information by encrypting the first hash value using a private key of the first user and a private key of the second user. The terminal 10 may transmit the first transaction information to which the first cryptogram and the first condition information are added to the node on the network of the first blockchain.

Meanwhile, the terminal 10 may transmit the first cryptocurrency from the electronic wallet of the first user to the electronic wallet of the second user according to the first transaction information. In addition, the terminal 10 may transmit a public key of the first user which is required when the second user requests payment of the first cryptocurrency to the terminal 10-2 of the second user.

Also, the terminal 10 may receive a public key of the second user which is required when the first user requests payment of the second cryptocurrency according to the second transaction information from the terminal 10-2 of the second user.

When the terminal 10 receives a message indicating that verification of the first transaction in the network of the first blockchain and verification of the second transaction in the network of the second blockchain are completed, the terminal 10 may receive the second cryptocurrency using the public key of the second user.

Meanwhile, in FIG. 2, only the first cryptocurrency transacted based on the first blockchain and the second cryptocurrency transacted based on the second blockchain are described, but it may be understood by one of ordinary skill in the technical field according to the present disclosure that transactions between cryptocurrencies transacted in each of three or more types of blockchains based on three or more different types of blockchain may also be performed.

In addition, in FIG. 2, the exchange of different cryptocurrencies between two users is described, but the contents of the present disclosure may also be applied when exchanging different cryptocurrencies between at least three users.

Figure 3:
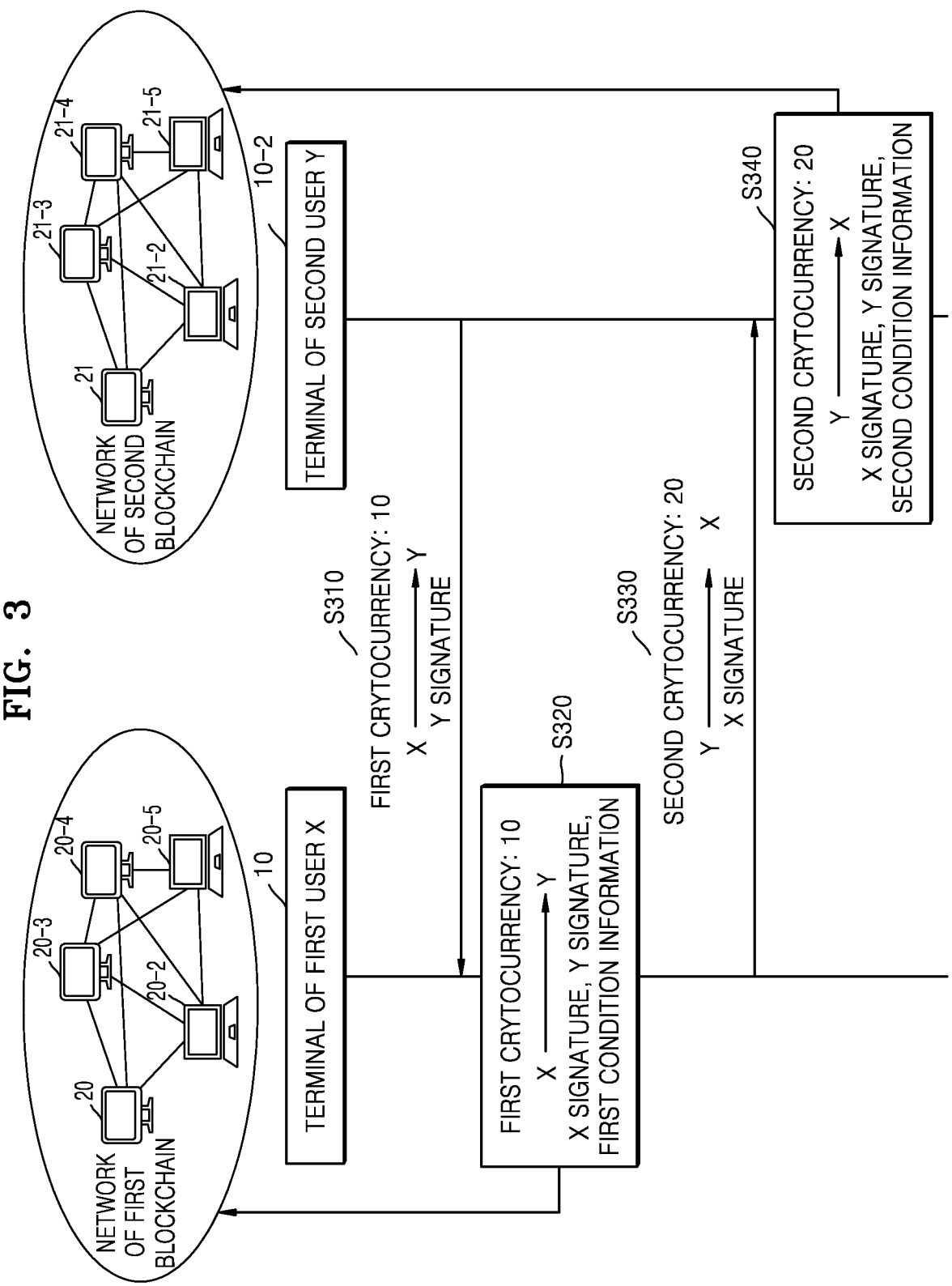
FIG. 3 is a diagram illustrating a process in which each terminal digitally signs transaction information to which condition information is added and transmits the transaction information to a network of blockchain according to an embodiment.

FIG. 3 is a diagram illustrating a process in which each terminal digital signs transaction information to which condition information is added and transmits the transaction information to a network of blockchain according to an embodiment.

In operation S310, the terminal 10-2 of a second user may transmit first transaction information requesting the transmission of a first cryptocurrency to the terminal 10 of a first user. For example, the first transaction information may be information about "a first transaction in which the first user transmits the first cryptocurrency 10 cash to the second user". Also, the terminal 10-2 of the second user may digital sign and transmit the first transaction information using a private key of the second user.

In operation S320, the terminal 10 of the first user may identify the first transaction information, encrypt the identified first transaction information, and transmit the encrypted first transaction information to nodes 20, 20-2, 20-3, 20-4, and 20-5 of the network of a first blockchain.

Specifically, the terminal 10 of the first user may confirm whether the first transaction information satisfies terms of condition between the first user and the second user. Here, the terms of agreement may include terms of a transaction for exchanging cryptocurrencies based on different blockchains between the first user and the second user. For example, the terms of condition may be a condition in which the first cash and the second cryptocurrency are exchanged at a ratio of one cash of the first cryptocurrency to two cashes of a second cryptocurrency.

If the first transaction information satisfies the terms of agreement between the first user and the second user, the terminal 10 of the first user may add first condition information depending on the validity of second transaction information and activating the first transaction of the first cryptocurrency to the first transaction information. Here, the second transaction information is transaction information with respect to the second transaction accompanying the first transaction, and may be information that the first user receives the second cryptocurrency based on the second blockchain from the second user.

For example, the first condition information may include condition information for activating the "first transaction in which the first user sends the first cryptocurrency 10 cash to the second user" recorded on a block connected to the first blockchain if a block recording the second transaction information with respect to "the second transaction in which the second user transmits a second cryptocurrency 20 cash to the first user" is added to the second blockchain as a valid block.

In addition, the first condition information may include condition information for invalidating the first transaction if the second transaction information with respect to "the second transaction in which the second user transmits the second cryptocurrency 20 cash to the first user" is transmitted to the terminal 10-2 of the second user and, and, even after a predetermined period of time, the block recording the second transaction information is not added to the second blockchain as the valid block.

In addition, the first condition information may include condition information for deactivating the first transaction until the block recording the second transaction information with respect to "the second transaction in which the second user transmits the second cryptocurrency 20 cash to the first user" is added to the second blockchain as the valid block.

The terminal 10 of the first user may calculate a first hash value by applying a hash function to the first transaction information to which the first condition information is added. The terminal 10 of the first user may generate a first cryptogram indicating the digital signature of the first transaction information by encrypting the first hash value using a private key of the first user and a private key of the second user. The terminal 10 of the first user may transmit the first transaction information to which the first cryptogram and the first condition information are added to the node on the network of the first blockchain.

In operation S330, the terminal 10 of the first user may transmit the second transaction information with respect to the "second transaction in which the second user transmits the second cryptocurrency 20 cash to the first user" to the terminal 10-2 of the second user. Although the terminal 10 of the first user performs operation S330 after operation S320 in FIG. 3, the terminal 10 of the first user may perform operation S320 after operation S330.

In operation S340, the terminal 10-2 of the second user may identify the second transaction information, encrypt the identified second transaction information, and transmit the encrypted second transaction information to nodes 21, 21-2, 21-3, 21-4, and 21-5 of the network of a second blockchain.

Specifically, the terminal 10-2 of the second user may confirm whether the second transaction information satisfies terms of condition between the first user and the second user.

If the second transaction information satisfies the terms of agreement between the first user and the second user, the terminal 10-2 of the second user may add second condition information depending on the validity of first transaction information and activating the second transaction of the second cryptocurrency to the second transaction information. Here, the first transaction information is transaction information with respect to the first transaction accompanying the second transaction, and may be information that the second user receives the first cryptocurrency based on the first blockchain from the first user.

For example, the second condition information may include condition information for activating the "second transaction in which the second user sends the second cryptocurrency 20 cash to the first user" recorded on a block connected to the second blockchain if a block recording the information with respect to "the first transaction in which the first user transmits the first cryptocurrency 10 cash to the second user" is added to the first blockchain as a valid block.

In addition, the second condition information may include condition information for invalidating the second transaction if the first transaction information with respect to "the first transaction in which the first user transmits the first cryptocurrency 10 cash to the second user" is transmitted to the terminal 10 of the first user and, and, even after a predetermined period of time, the block recording the first transaction information is not added to the second blockchain as the valid block.

In addition, the second condition information may include condition information for deactivating the second transaction until the block recording the first transaction information with respect to "the first transaction in which the first user transmits the first cryptocurrency 10 cash to the second user" is added to the first blockchain as the valid block.

The terminal 10-2 of the second user may calculate a second hash value by applying a hash function to the second transaction information to which the second condition information is added. The terminal 10-2 of the second user may generate a second cryptogram indicating the digital signature of the second transaction information by encrypting the second hash value using a private key of the first user and a private key of the second user. The terminal 10-2 of the second user may transmit the second transaction information to which the second cryptogram and the second condition information are added to the node on the network of the second blockchain.

Figure 4:
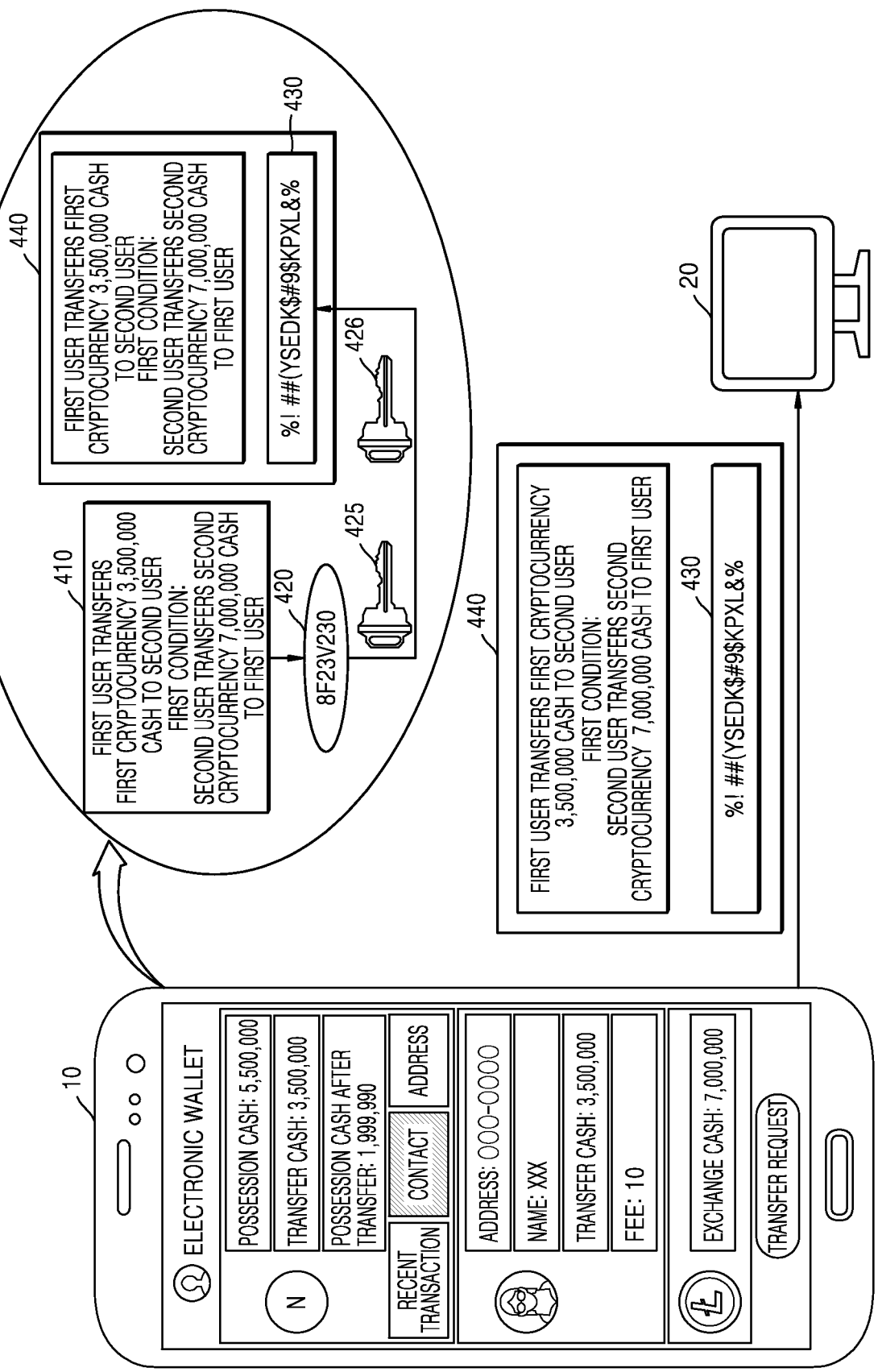
FIG. 4 is a diagram illustrating a process in which a terminal transmits digitally signed transaction information to a node on a network of blockchain according to an embodiment.

FIG. 4 is a diagram illustrating a process in which a terminal transmits digital signed transaction information to a node on the network of blockchain according to an embodiment.

The terminal 10 of a first user may encrypt first transaction information 410 including transaction information that "the first user transfers first cryptocurrency 3,500,000 cash to a second user" and first condition information that "the second user transfers second cryptocurrency 7,000,000 cash to the first user", and transmit encrypted transaction information 440 to the first node 20 on the network of blockchain.

Specifically, the terminal 10 of the first user may apply the first transaction information 410 including the transaction information that "the first user transfers first cryptocurrency 3,500,000 cash to the second user" and the first condition information that "the second user transfers second cryptocurrency 7,000,000 cash to the first user" to a hash function for generating unique data of the transaction information to generate a hash value 420 "8F23V230" corresponding to the first transaction information 410.

The terminal 10 of the first user may sequentially encrypt the hash value 420 "8F23V230" with a private key 425 of the first user and a private key 426 of the second user to generate a first cryptogram 430 "%! ##(YSEDK$ #9$KPXL&%" indicating a digital signature of the first transaction information 410. The terminal 10 of the first user may transmit the transaction information 440 combining the first cryptogram 430 "%! ##(YSEDK$ #9$KPXL&%" with the first transaction information 410 to the first node 20.

Figure 5:
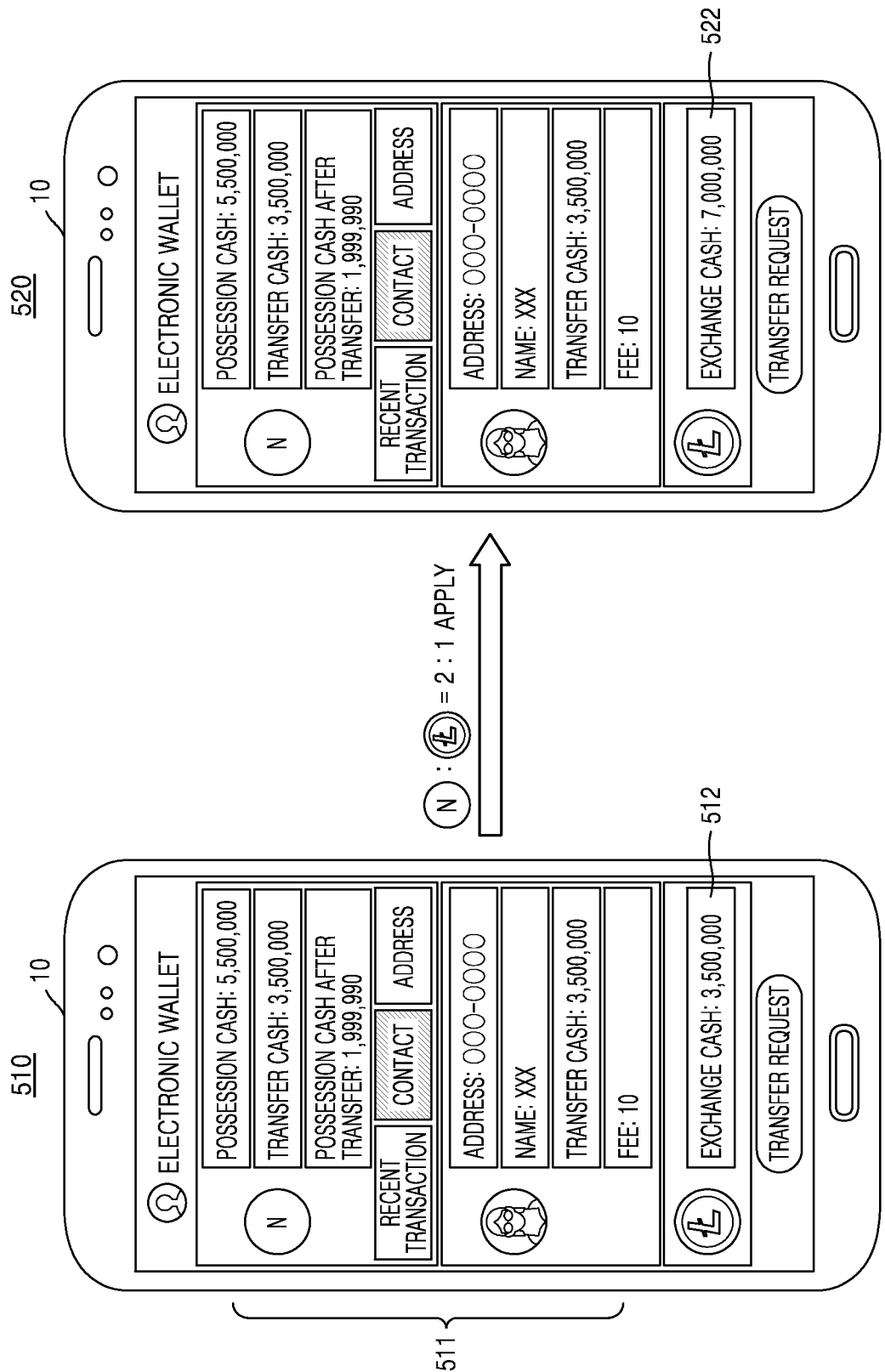
FIG. 5 is a diagram illustrating a process of correcting a transfer amount of a predetermined cryptocurrency according to an exchange ratio between cryptocurrencies according to an embodiment.

FIG. 5 is a diagram illustrating a process of correcting a transfer amount of a predetermined cryptocurrency according to an exchange ratio between cryptocurrencies according to an embodiment.

Referring to 510 of FIG. 5, the terminal 10 of a first user may display a user interface managing account information of the first user with respect to cryptocurrency and the cryptocurrency according to the execution of the electronic wallet of the first user.

The terminal 10 of the first user may perform a transaction of exchanging a first cryptocurrency transacted based on a first blockchain and a second cryptocurrency transacted based on a second blockchain. The terminal 10 of the first user may display information 511 according to the transaction of the first cryptocurrency and information 512 according to the transaction of the second cryptocurrency.

Specifically, in relation to an operation for the terminal 10 of the first user of displaying the information 511 according to the transaction of the first cryptocurrency, the terminal 10 of the first user may display information used to transfer the first cryptocurrency from an electronic wallet of the first user to an electronic wallet of a second user, and balance information of the first cryptocurrency to be changed by transferring the first cryptocurrency. For example, the terminal 10 of the first user may display information about 3,500,000 cash as the transfer amount of first cryptocurrency, and 1,999,990 cash as the balance of first cryptocurrency after the transfer.

The terminal 10 of the first user may display icons that provide history information of the recent transaction of the cryptocurrency, contact information stored in the terminal 10 of the first user, and information of the electronic wallet stored in the terminal 10 of the first user.

In addition, in relation to an operation for the terminal 10 of the first user of displaying the information 512 according to the transaction of the second cryptocurrency, the terminal 10 of the first user may display information about the second cryptocurrency to receive from the electronic wallet of the second user. For example, the terminal 10 of the first user may display the amount of the second cryptocurrency based on second transaction information received from the terminal 10-2 of the second user.

Here, the terminal 10 of the first user may determine whether the first transaction of the first cryptocurrency and the second transaction of the second cryptocurrency are suitable based on a predetermined exchange ratio of the first cryptocurrency and the second cryptocurrency. For example, the predetermined exchange ratio between the first cryptocurrency and the second cryptocurrency may be 1:2. As shown in 510 of FIG. 5, because the transfer amount of the first cryptocurrency is 3,500,000 cash, and the exchange amount of the second cryptocurrency is 3,500,000 cash, the terminal 10 of the first user may determine that the first transaction of the first cryptocurrency and the second transaction of the second cryptocurrency are unsuitable.

Referring to 520 of FIG. 5, the terminal 10 of the first user may automatically correct the transfer amount of the first cryptocurrency or the transfer amount of the second cryptocurrency according to the exchange ratio of 1:2 of the first cryptocurrency and the second cryptocurrency. The terminal 10 of the first user may correct the exchange amount of the second cryptocurrency to 7,000,000 cash. In addition, the terminal 10 of the first user may correct the exchange amount of the second cryptocurrency to 7,000,000 cash based on an input of the first user.

Figure 6:
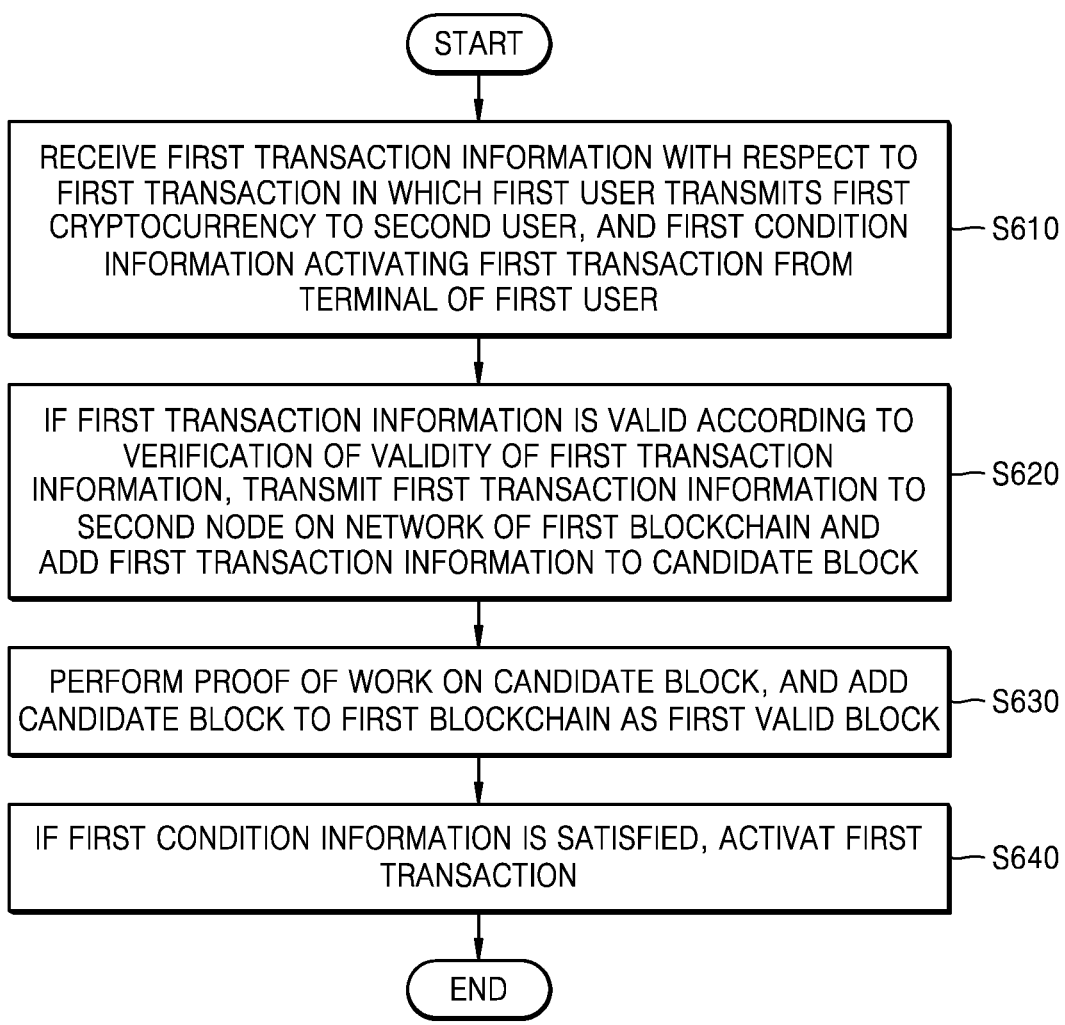
FIG. 6 is a flowchart illustrating a method of operating a node on a network of a blockchain, in order to transact cryptocurrencies based on different kinds of blockchain between terminals according to an embodiment.

FIG. 6 is a flowchart illustrating a method of operating a node on a network of a blockchain, in order to transact cryptocurrencies based on different kinds of blockchains between terminals according to an embodiment.

In operation S610, the first node 20 may receive first transaction information with respect to a first transaction in which a first user transmits a first cryptocurrency to a second user, and first condition information depending on the validity of second transaction information with respect to a second cryptocurrency based on a second blockchain and activating the first transaction from the terminal 10 of the first user.

Here, the first node 20 may receive a first cryptogram digital signed to prove the terms of agreement to the first transaction information to which the first condition information is added and the first transaction information to which the first condition information is added from the terminal 10 of the first user. Here, the terms of agreement may include terms of a transaction of exchanging cryptocurrencies based on different blockchains between the first user and the second user.

In operation S620, the first node 20 may verify the validity of the first transaction information. If the first transaction information is valid, the first node 20 may transmit the first transaction information to a second node on the network of the first blockchain. The first node 20 may add the first transaction information to a candidate block.

In operation S630, the first node 20 may perform proof of work on the candidate block, and add the candidate block to the first blockchain as a first valid block.

In operation S640, if the first condition information is satisfied, the first node 20 may activate the first transaction.

Here, the first condition information may be condition information for activating the first transaction according to the first transaction information recorded in a block connected to the first blockchain if a block recording the second transaction information is added to the second blockchain as the valid block.

The first node 20 may determine whether the first condition information is satisfied with reference to a hash value of the second transaction information based on the second blockchain in the first transaction information recorded in a first block of the first blockchain. As a result of referring to the hash value of the second transaction information, if the second transaction information is not recorded in the second blockchain, the first node 20 may deactivate the first transaction.

Figure 7:
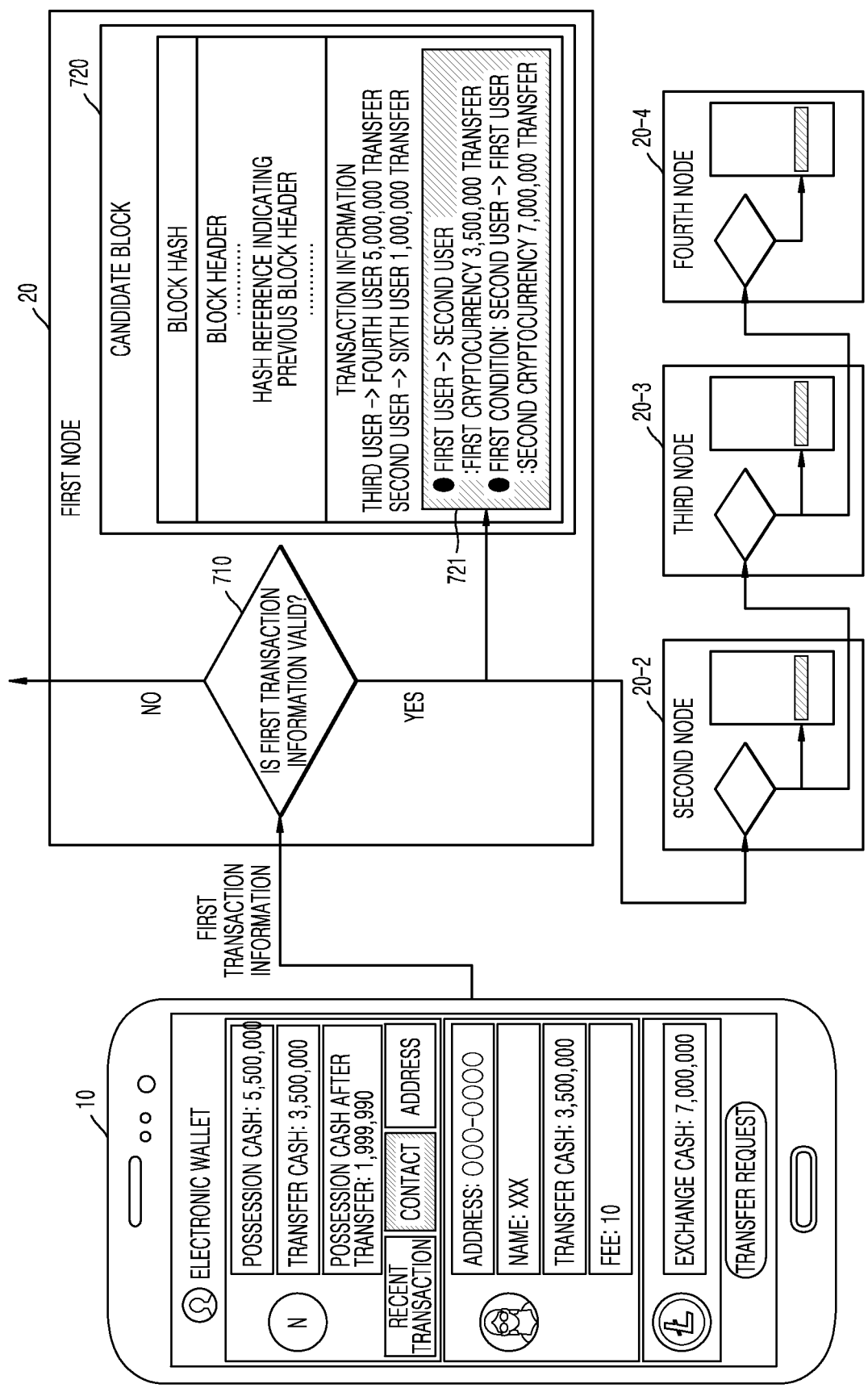
FIG. 7 is a diagram illustrating a process of propagating a valid transaction of cryptocurrency on a network of blockchain to nodes on a network of blockchain, and recording the transaction on blockchain according to an embodiment.

FIG. 7 is a diagram illustrating a process of propagating a valid transaction of cryptocurrency on the network of blockchain to nodes on the network of blockchain, and recording the transaction on blockchain according to an embodiment.

Referring to FIG. 7, the terminal 10 may execute an electronic wallet of a first user. The terminal 10 of a first user may transfer cryptocurrency 3,500,000 cash to an electronic wallet of a second user, based on first transaction information including transaction information that the first user transfers first cryptocurrency 3,500,000 cash to the second user and first condition information that the second user transfers second cryptocurrency 7,000,000 cash to the first user. The terminal 10 of the first user may encrypt the first transaction information including the first condition information and transmit the encrypted first transaction information to the first node 20 on the network of blockchain. The operation performed by the terminal 10 of the first user of encrypting the first transaction information and transmitting the encrypted first transaction information to the first node 20 is described with reference to FIG. 4.

The first node 20 may decrypt the encrypted first transaction information and verify 710 whether the first transaction information is valid based on a decryption result. The operation performed by the first node 20 of verifying the validity of the first transaction information will be described in detail in FIG. 8.

As a result of verifying the validity of the first transaction information, if the first transaction information is not valid, the first node 20 may discard the first transaction information.

As a result of verifying the validity of the first transaction information, if the first transaction information is valid, the first node 20 may transmit the first transaction information to a second node 20-2 on the network of blockchain. In addition, the first node 20 may record first transaction information 721 including the transaction information that the first user transfers first cryptocurrency 3,500,000 cash to the second user and the first condition information that the second user transfers second cryptocurrency 7,000,000 cash to the first user on a candidate block 720. When predetermined transaction information is recorded on the candidate block 720, the first node 20 may perform proof of work on the candidate block 720 to generate a valid block. In addition, when the validity of the first transaction information 721 is also verified in the second node 20-2, the second node 20-2 may add the first transaction information 721 to the candidate block 720 and perform proof of work on the candidate block 720 to generate a first valid block. The generated first bock may include the first transaction information 721 including the transaction information that the first user transfers first cryptocurrency 3,500,000 cash to the second user and the first condition information that the second user transfers second cryptocurrency 7,000,000 cash to the first user. A third node 20-3 and a fourth node 20-4 may operate in the same way as the second node 20-2.

Referring to the process that the first node 20 generates the valid block and add the valid block to blockchain, the first node 20 may calculate t root of a Merkle tree with respect to predetermined transaction information. The first node 20 may generate a hash reference indicating a previous block header from a block to be added to blockchain. The first node 20 may obtain the difficulty required in proof of work or a constraint of the block to be added to blockchain. The first node 20 may confirm whether a value of a block hash that is generated by applying a hash function to the root of the Merkle tree, the hash reference indicating the previous block header, the difficulty, data of timestamp, and a nonce satisfies the constraint. The first node 20 may increase the nonce from 0 by 1 and obtain a value of the nonce that satisfies the constraint, thereby performing proof of work on the candidate block 720. The first node 20 may add the candidate block 720 to blockchain as the valid block. In addition, the first node 20 may transmit the valid block to the other nodes 20-2, 20-3, 20-4, etc. on the network of blockchain.

Each of the nodes 20-2, 20-3, 20-4, etc. on the network of blockchain may perform verification on the valid block received from the first node 20 to add the valid block to blockchain possessed by each of the nodes 20-2, 20-3, 20-4, etc.

Figure 8:
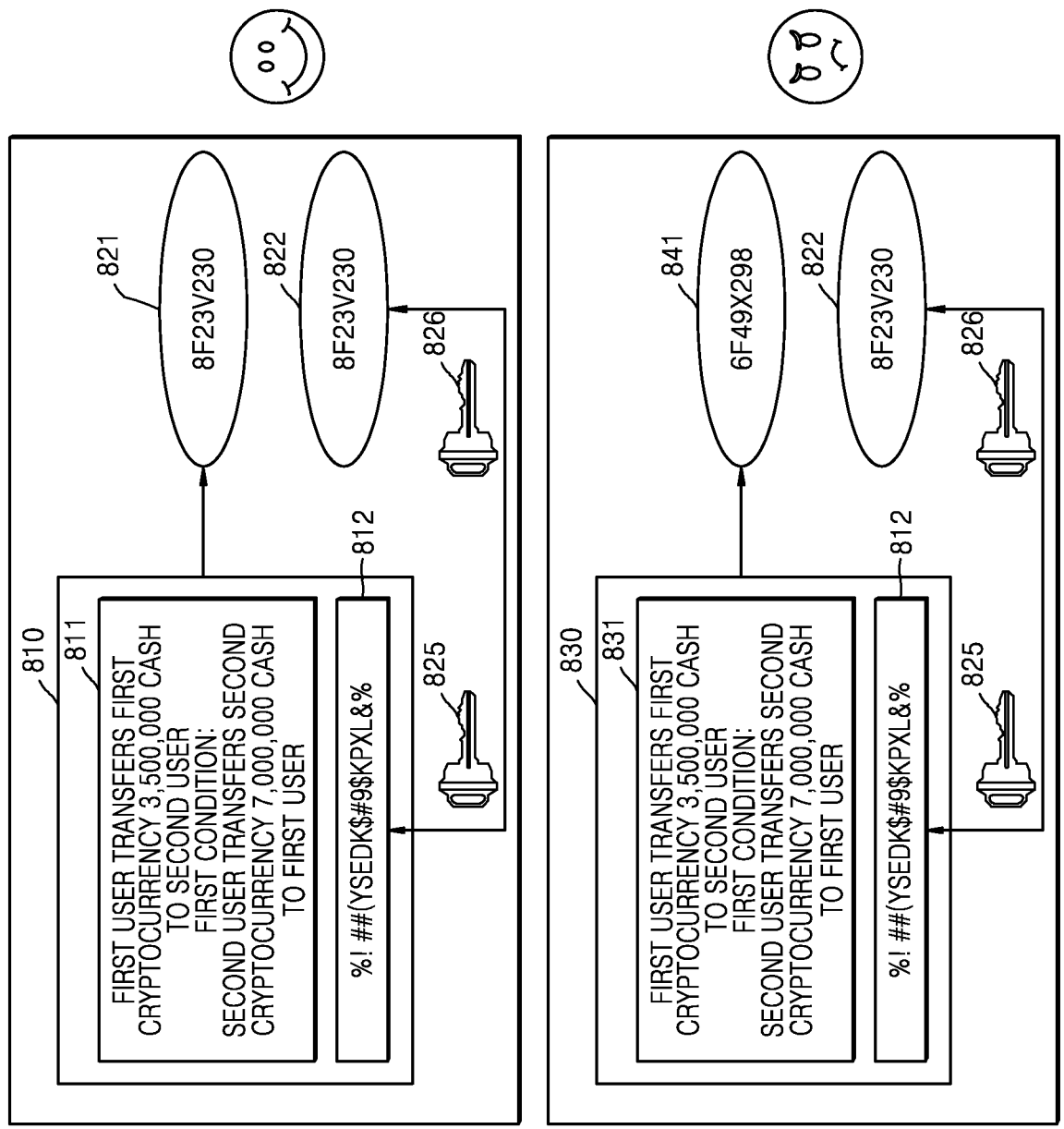
FIG. 8 is a diagram illustrating a process in which a node on a network of blockchain verifies the validity of transaction information including condition information according to an embodiment.

FIG. 8 is a diagram illustrating a process in which a node on a network of blockchain verifies the validity of transaction information including condition information according to an embodiment.

For example, the first node 20 may receive first transaction information 810 from the terminal 10 of a first user. The first transaction information 810 may include transaction information 811 including transaction information that "the first user transfers first cryptocurrency 3,500,000 cash to a second user" and first condition information that "the second user transfers second cryptocurrency 7,000,000 cash to the first user", and a first cryptogram 812 "%! ##(YSEDK$ #9$KPXL&%". The first node 20 may apply a hash function to the transaction information 811 to generate a hash value 821 "8F23V230" corresponding to the transaction information 811. The first node 20 may decrypt the first cryptogram 812 "%! ##(YSEDK$ #9$KPXL&%" using a public key 825 of the first user and a public key 826 of the second user to generate a hash value 822 "8F23V230". Because the hash value 821 "8F23V230" and the hash value 822 "8F23V230" are the same, the first node 20 may determine that the transaction information 810 received from the terminal 10 of the first user is valid.

For another example, the first node 20 may receive transaction information 830 from the terminal 10 of the first user. The transaction information 830 may include transaction information 831 including transaction information that "the first user transfers first cryptocurrency 2,500,000 cash to the second user" and first condition information that "the second user transfers second cryptocurrency 7,000,000 cash to the first user", and the first cryptogram 812 "%!

Figure 9:
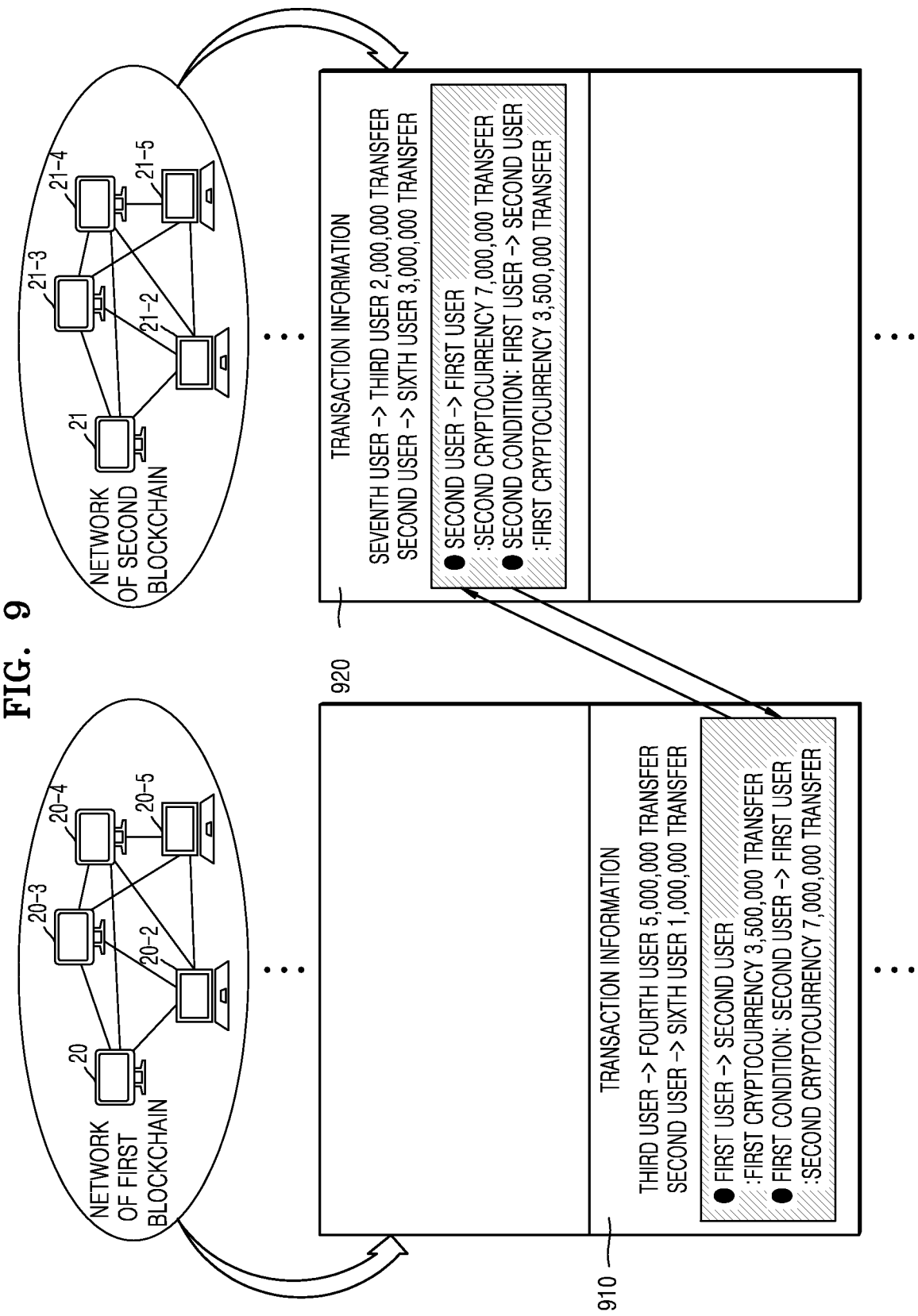
FIG. 9 is a diagram illustrating a process of activating a transaction by determining whether condition information is satisfied in each of different kinds of blockchain, according to an embodiment.

(YSEDK$ #9$KPXL&%". The first node 20 may apply a hash function to the transaction information 831 to generate a hash value 841 "6F49X298" corresponding to the transaction information 831. The first node 20 may decrypt the first cryptogram 812 "%! ##(YSEDK$ #9$KPXL&%" using the public key 825 of the first user and the public key 826 of the second user to generate the hash value 822 "8F23V230". Because the hash value 841 "6F49X298" and the hash value 822 "8F23V230" are not the same, the first node 20 may determine that the transaction information 830 received from the terminal 10 of the first user is invalid FIG. 9 is a diagram illustrating a process of activating a transaction by determining whether condition information is satisfied in each of different kinds of blockchains, according to an embodiment.

The nodes 20, 20-2, 20-3, 20-4, and 20-5 in the network of a first blockchain may verify transaction information received from a plurality of terminals respectively. For example, the first node 20 may verify the validity of first transaction information based on a hash value included in the first transaction information including transaction information that "a first user transfers first cryptocurrency 3,500,000 cash to a second user" and first condition information that "the second user transmits second cryptocurrency 7,000,000 cash to the first user" that are received using digital signatures and proof of work. The first node 20 may generate a first block 910 recording the first transaction information of which validity is verified by performing proof of work. The first node 20 may add the first block 910 to the first blockchain, and transmit information proving the validity of transaction information recorded in the first block 910 to the network of a first blockchain to release that the first block 910 is valid. Then, each of the nodes 20-2, 20-3, 20-4, and 20-5 in the network of the first blockchain may verify the validity of the first block 910 added to the first blockchain. As a result of verification, if the first block 910 is valid, the nodes 20-2, 20-3, 20-4, and 20-5 may respectively add the first block 910 to the first blockchain of the nodes 20-2, 20-3, 20-4, and 20-5. Meanwhile, if the first block 910 is not valid, each of the nodes 20-2, 20-3, 20-4, and 20-5 may discard the first block 910.

Meanwhile, the first node 20 may determine whether the first condition information in the first transaction information recorded in the first block 910 added to the first blockchain is satisfied. The first node 20 may refer to a hash value of the second transaction information based on a second blockchain included in the first condition information. As a result of referring to the hash value, if the second block 920 recording the second transaction information is connected to the second blockchain, the first node 20 may activate the first transaction according to the first transaction information. Meanwhile, if the second block 920 recording the second transaction information is not connected to the second blockchain, the first node 20 may deactivate the first transaction according to the first transaction information.

The nodes 21, 21-2, 21-3, 21-4, and 21-5 in the network of the second blockchain may verify transaction information received from the plurality of terminals respectively. For example, the first node 20 may verify the validity of the second transaction information based on a hash value included in the second transaction information including transaction information that "the second user transmits second cryptocurrency 7,000,000 cash to the first user" and the second condition information that "the first user transfers first cryptocurrency 3,500,000 cash to the second user" that are received using digital signatures and proof of work. The second node 21 may generate a second block 920 recording the second transaction information of which validity is verified by performing proof of work. The second node 21 may add the second block 920 to the second blockchain, and transmit information proving the validity of transaction information recorded in second block 920 to the network of the second blockchain to release that the second block 920 is valid. Then, each of the nodes 21-2, 21-3, 21-4, and 21-5 in the network of the second blockchain may verify the validity of the second block 920 added to the second blockchain. As a result of verification, if the second block 920 is valid, the nodes 21-2, 21-3, 21-4, and 21-5 may respectively add the second block 920 to the second blockchain of the nodes 21-2, 21-3, 21-4, and 21-5. Meanwhile, if the second block 920 is not valid, each of the nodes 21-2, 21-3, 21-4, and 21-5 may discard the second block 920.

Meanwhile, the second node 21 may determine whether the second condition information in the second transaction information recorded in the second block 920 added to the second blockchain is satisfied. The second node 21 may refer to a hash value of the first transaction information based on the first blockchain included in the second condition information. As a result of referring to the hash value, if the first block 910 recording the first transaction information is connected to the first blockchain, the second node 21 may activate the second transaction according to the second transaction information. Meanwhile, if the first block 910 recording the first transaction information is not connected to the first blockchain, the second node 21 may deactivate the second transaction according to the second transaction information.

Figure 10:
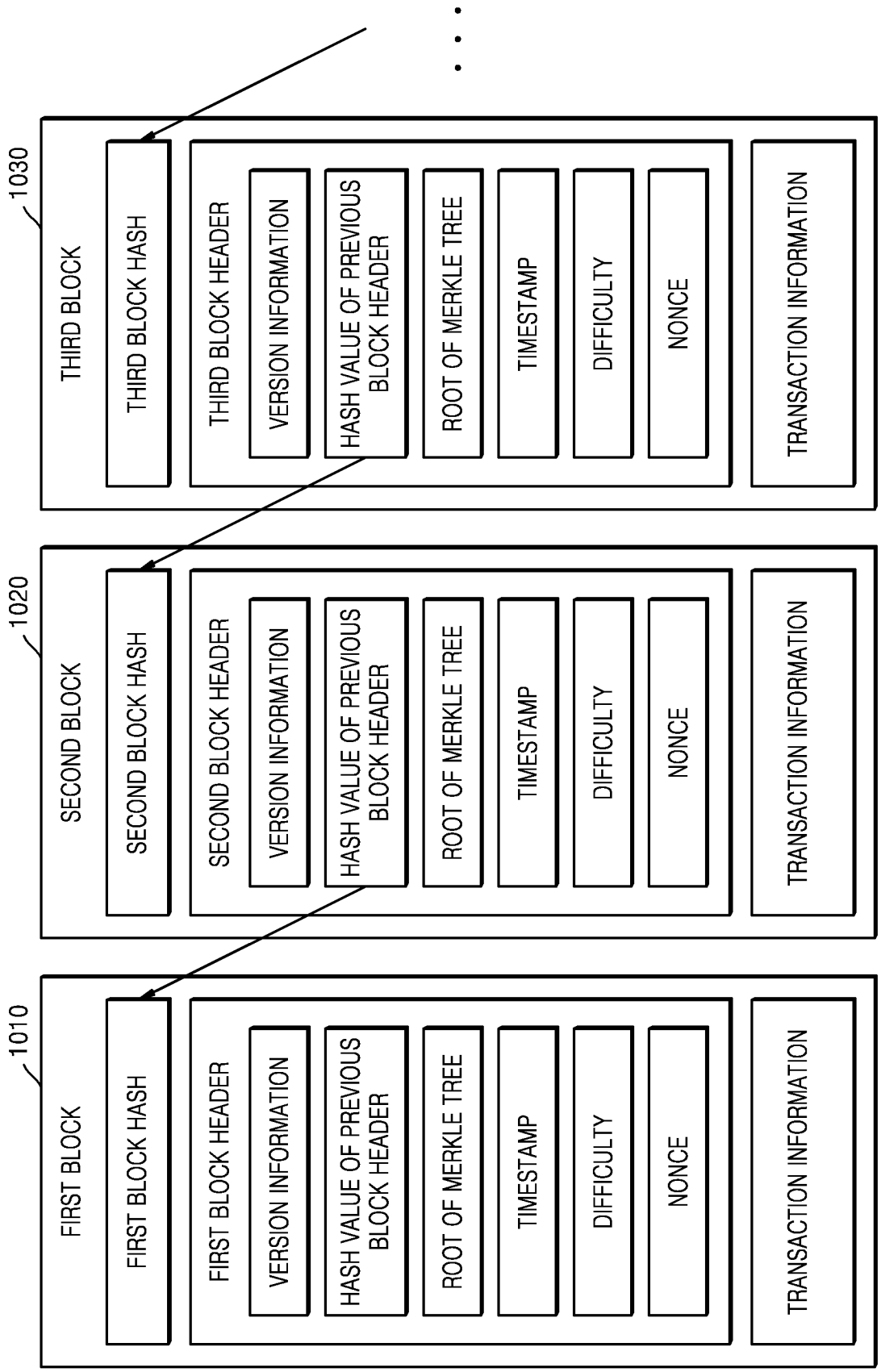
FIG. 10 is a block diagram illustrating a block and the structure of blockchain according to an embodiment.

FIG. 10 is a block diagram illustrating a block and the structure of blockchain according to an embodiment.

As shown in FIG. 10, blockchain may be configured by connecting blocks that record valid transaction information. That is, the data structure of blockchain may be a predetermined data structure including units in which blocks that record transaction information are arranged in order. In addition, the data structure of blockchain may be configured as a data structure in which respective block headers are connected in the format of a chain with reference to previous block headers, and a data structure of a Merkle tree in which hash references indicating data of transaction information and the data of the transaction information are connected in the shape of a tree.

The block may include a block hash, block header, transaction information, and the like. The block header may include a version of the current program, a hash value of a previous block header, a root of a Merkle tree, a timestamp, difficulty and information of a nonce.

The block hash may be a hash value of a hash function applied using the version of the current program, the hash value of the previous block header, the root of the Merkle tree, the timestamp, the difficulty and the information of the nonce as input values. That is, the value of the block hash may be a value obtained by hashing the block header, not a value obtained by hashing the entire block.

The hash value of the previous block header may be used to uniquely identify each block header and refer to the previous block header. If each block header refers to the previous block header, the order of individual block headers and blocks may be maintained. Referring to FIG. 10, because a first block 1010 is a first block and has no previous block, there is no reference indicating the previous block header. Therefore, the hash value of the previous block header of the first block 1010 is 0. Also, because a second block 1020 has the first block 1010 as a previous block, a second block header has a hash value indicating a first block header. Similarly, because a third block 1030 has the second block 1020 as a previous block, a third block header has a hash value indicating the second block header.

The Merkle tree may refer to a structure in which the hash references and the data of the transaction information are connected in the form of the tree. The hash references may refer to the data of the transaction information using an encrypted hash value. Meanwhile, because the encrypted hash value is a unique value of data, different data do not have the same hash value.

Upon explaining a process of generating the Merkle tree in detail, the hash references (e.g., a first hash reference, a second hash reference, a third hash reference, and a fourth hash reference) respectively indicating the data of the transaction information (e.g., first transaction information, second transaction information, third transaction information, and fourth transaction information) may be generated. When the hash references are generated, hash references (e.g., a 12th hash reference indicating the first hash reference and the second hash reference and a 34th hash reference indicating the third hash reference and the fourth hash reference) indicating pairs of the hash references may be generated. Then, a work of generating the hash references indicating the pairs of hash references may be repeatedly performed to generate a single hash reference (e.g., a 1234th hash reference indicating the 12th hash reference and the 34th hash reference). That is, the Merkle tree may be a tree-shape structure that starts from the single hash reference and is connected to the data of each transaction information. The root of the Merkle tree may refer to a finally generated single hash reference.

The timestamp may indicate the time when a work starts for proof of the work. The difficulty may mean a constraint in proof of work or hash puzzles. The nonce may mean a value that is adjusted such that the value of the block hash satisfies the constraint for proof of work.

Figure 11:
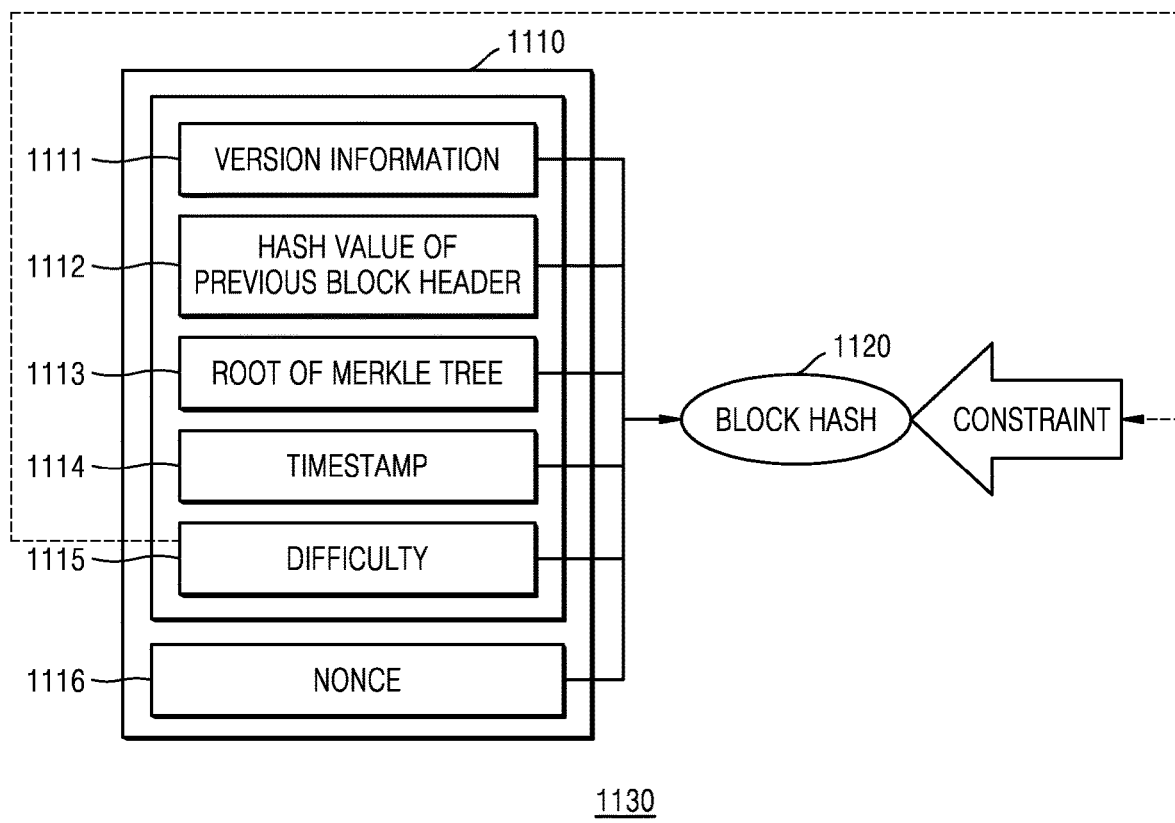
FIG. 11 is a diagram illustrating a method, performed by a node on a network of blockchain, of obtaining proof of work and a nonce of a block according to an embodiment.

FIG. 11 is a diagram illustrating a method performed by a node on a network of blockchain of obtaining proof of work and a nonce of a block according to an embodiment.

Nodes on the network of blockchain may verify the validity of transaction information and the validity of a block header such that a valid block including only data of valid transaction information and the block header may be connected to blockchain.

Each node may perform proof of work on the block to generate the valid block. Here, proof of work may mean solving a unique hash puzzle of the block.

An element 1110 for proof of work may include given data that should not be changed, freely changeable data, a hash function to be applied, and a constraint given to a hash value. Here, the given data that should not be changed may include version information 1111, a hash value 1112 of a previous block header, a root of a Merkle tree 1113, a timestamp 1614, and data about a difficulty 1115. Further, the freely changeable data may be a nonce 1116. Also, the constraint given to the hash value may be the difficulty 1115.

As shown in FIG. 11, proof of work may be performed when a value of a block hash 1120 generated by applying the hash function to the version information 1111, the hash value 1112 of the previous block header, the root of a Merkle tree 1113, the timestamp 1114, the data about the difficulty 1115, and the nonce 1116 satisfies the constraint.

Specifically, the node may generate the value of the block hash 1120 by guessing the nonce 1116, combining the guessed nonce 1116 with the version information 1111, the hash value 1112 of the previous block header, the root of a Merkle tree 1113, the timestamp 1114, and the data about the difficulty 1115, and applying the hash function, for proof of work on the block. The node may confirm whether the generated value of the block hash 1120 satisfies the constraint. If the value of the block hash 1120 satisfies the constraint, proof of work is completed, but if the value of the block hash 1120 does not satisfy the constraint, the node may repeat the same process after guessing another nonce.

A table 1130 of FIG. 11 shows nonces, data to be hashed, and hash values generated by combining the nonces and the data to be hashed and applied to the hash function. For example, the constraint may be a condition in which first three digits of the hash value are 0. The node may perform a process for proof of work while increasing the nonce from 0 by 1. Referring to the table 1130 of FIG. 11, a hash value (000EIXOKXP19) generated using a nonce 53 satisfies the constraint. The node may complete proof of work in 54 trials and errors from a nonce 0 to the nonce 53.

The difficulty 1115 may mean a constraint in proof of work or hash puzzles. The difficulty 1115 may be expressed as a natural number, and the number of the difficulty 1115 may mean the number of digits to be filled with 0 from a first digit of the hash value. Therefore, as the difficulty 1115 increases, the number of first digits to be filled with 0 increases. As the difficulty 1115 increases, proof of work or hash puzzles is complex, and more computational resources and time may be required to find a nonce that satisfies the constraint.

That is, proof of work may mean calculating a nonce value to obtain a value of the block hash, and generating a valid block having the obtained value of the block hash as an identifier. Meanwhile, the node that generates the valid block may be rewarded. Reward may be determined with the agreement of nodes on the network of blockchain.

Figure 12:
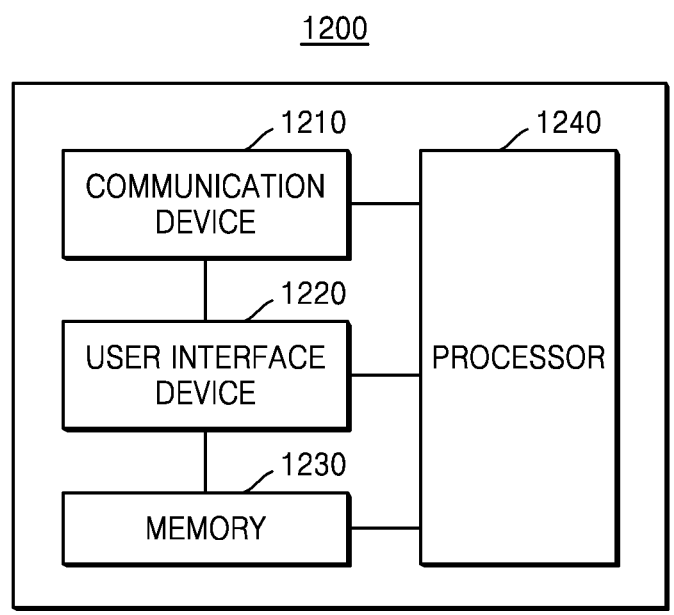
FIG. 12 is a block diagram illustrating the configuration of a terminal according to an embodiment.

FIG. 12 is a block diagram illustrating the configuration of a terminal according to an embodiment.

A terminal 1200 illustrated in FIG. 12 may include a communication device 1210, a user interface device 1220, a memory 1230, and a processor 1240. However, all of the illustrated components are not indispensable components. The electronic device 1200 may be implemented by more components than the illustrated components, and the electronic device 1200 may also be implemented by fewer components. Hereinafter, the components will be described. The terminal 1200 illustrated in FIG. 12 may correspond to the terminal 10 described with reference to FIGS. 1 to 11.

According to some embodiments, the communication device 1210 may communicate with an external device. Specifically, the communication device 1210 may be connected to a network by wired or wirelessly to perform communication with the external device. Here, the external device may be a server, a smartphone, a tablet, a PC, or a computing device. The communication device 1210 may include a communication module supporting one of various wired/wireless communication methods. For example, the communication module may be in the form of a chipset, or may be a sticker/barcode (e.g. a sticker including an NFC tag) including information necessary for communication. Further, the communication module may be a short-range communication module or a wired communication module.

For example, the communication device 1210 may support at least one of a wireless LAN, Wi-Fi (Wireless Fidelity), WFD (Wi-Fi Direct), Bluetooth, Bluetooth Low Energy (BLE), Wired LAN, NFC Near Field Communication, Zigbee, infrared data association (IrDA), 3G, 4G, and 5G.

According to some embodiments, the communication device 1210 may obtain first transaction information with respect to first transaction in which a first user transmits a first cryptocurrency to a second user. In addition, the communication device 1210 may transmit the second transaction information with respect to the second transaction accompanying the first transaction to a terminal of the second user. Here, the second transaction information may be information about the second transaction in which the first user receives a second cryptocurrency from the second user.

Here, each of the first transaction information and the second transaction information may include information about at least one of an address of an electronic wallet of a recipient to receive a predetermined cryptocurrency, an address of an electronic wallet of a transmitter to transmit the predetermined cryptocurrency, a transfer amount of the predetermined cryptocurrency, and a fee for the transfer of the predetermined cryptocurrency, but is not limited thereto.

According to some embodiments, the user interface device 1220 may refer to a device that receives data to control the terminal 1200 from a user. The processor 1240 may control the user interface device 1220 to generate and output a user interface screen for receiving a predetermined command or data from the user. The user interface device 1220 may include an input unit for receiving an input for controlling the operation of the terminal 1200, and an output unit for displaying information such as a result of the operation of the terminal 1200 or the state of the terminal 1200. For example, the user interface device 1220 may include an operation panel receiving a user input, a display panel displaying a screen, etc.

Specifically, the input unit may include devices capable of receiving various types of user input, for example, a keyboard, a physical button, a touch screen, a camera, or a microphone. Also, the output unit may include, for example, a display panel or a speaker. However, the present disclosure is not limited thereto, and the user interface device 1220 may include a device supporting various input/output.

According to some embodiments, the user interface device 1220 may display an execution screen of an electronic wallet of the first user. For example, the user interface device 1220 may display information of cryptocurrency possessed in the electronic wallet of the first user. Also, the user interface device 1220 may display a screen executed by the first user to transact cryptocurrency with another user.

The memory 1230 may include at least one type storage medium of a flash memory type, a hard disk type, a multimedia card micro type, a card type memory (e.g., SD or XD memory, etc.), random access memory (RAM), static random access memory (SRAM), read only memory (ROM), electrically erasable programmable read-only memory (EEPROM), programmable read-only memory (PROM), a magnetic memory, a magnetic disk, or an optical disk. The memory 1230 may store at least one program for executing a method of controlling an operation of an electronic wallet executed in the terminal 1200 on a computer. The at least one program stored in the memory 1230 may be classified into a plurality of modules according to functions.

The processor 1240 may control the overall operation of the terminal 1200, and may include at least one processor such as a CPU. The processor 1240 may control other components included in the terminal 1200 to perform an operation corresponding to a user input received through the user interface device 1220. Further, the processor 1240 may include at least one specialized processor corresponding to each function, or may be a processor integrated into one.

The processor 1240 may execute a program stored in the memory 1230, read data or a file stored in the memory 1230, or store a new file in the memory 1230. Also, the processor 1240 may execute instructions stored in the memory 1230.

According to some embodiments, if the first transaction information satisfies terms of condition between the first user and the second user, the processor 1240 may add first condition information depending on the validity of the second transaction information and activating the first transaction of the first cryptocurrency to the first transaction information.

Here, the first condition information may be condition information for activating the first transaction according to the first transaction information recorded on a block connected to a first blockchain if a block recording the second transaction information is added to a second blockchain as a valid block.

In addition, the first condition information may be condition information for invalidating the first transaction if the second transaction information is transmitted to the terminal of the second user, and, after a predetermined period of time, the block recording the second transaction information is not added to the second blockchain as the valid block.

Also, the first condition information may be condition information for deactivating the first transaction until the block recording the second transaction information is added to the second blockchain as the valid block.

According to some embodiments, the processor 1240 may digital sign the first transaction information to which the first condition information is added, to prove the terms of condition, and transmit the first transaction information to a node on the network of the first blockchain through the communication device 1210.

According to some embodiments, the processor 1240 may calculate a first hash value by applying a hash function to the first transaction information to which the first condition information is added. The processor 1240 may generate a first cryptogram indicating the digital signature of the first transaction information by encrypting the first hash value using a private key of the first user and a private key of the second user. The processor 1240 may transmit the first transaction information to which the first cryptogram and the first condition information are added to the node on the network of the first blockchain through the communication device 1210.

Meanwhile, the processor 1240 may control the first cryptocurrency to be transmitted from the electronic wallet of the first user to the electronic wallet of the second user according to the first transaction information. In addition, the processor 1240 may transmit a public key of the first user which is required when the second user requests payment of the first cryptocurrency to the terminal of the second user through the communication device 1210.

Also, the processor 1240 may receive a public key of the second user which is required when the first user requests payment of the second cryptocurrency according to the second transaction information from the terminal of the second user through the communication device 1210.

When the processor 1240 receives a message indicating that verification of the first transaction in the network of the first blockchain and verification of the second transaction in the network of the second blockchain are completed through the communication device 1210, the processor 1240 may receive the second cryptocurrency using the public key of the second user.

FIG. 13 is a block diagram illustrating the configuration of a node on the network of blockchain according to an embodiment.

A node 1300 illustrated in FIG. 13 may include a communication device 1310, a memory 1320, and a processor 1330. However, all of the illustrated components are not indispensable components. The node 1300 may be implemented by more components than the illustrated components, and the node 1300 may also be implemented by fewer components. Hereinafter, the components will be described. The node 1300 illustrated in FIG. 13 may correspond to the node 20 described with reference to FIGS. 1 to 11.

According to some embodiments, the communication device 1310 may communicate with an external device. Specifically, the communication device 1310 may be connected to a network by wired or wirelessly to perform communication with the external device. Here, the external device may be a server, a smartphone, a tablet, a PC, or a computing device. The communication device 1310 may include a communication module supporting one of various wired/wireless communication methods. For example, the communication module may be in the form of a chipset, or may be a sticker/barcode (e.g. a sticker including an NFC tag) including information necessary for communication. Further, the communication module may be a short-range communication module or a wired communication module.

The communication device 1310 may receive first transaction information with respect to a first transaction in which a first user transmits a first cryptocurrency to a second user, and first condition information depending on the validity of second transaction information with respect to a second cryptocurrency based on a second blockchain and activating the first transaction from a terminal of the first user.

The communication device 1310 may receive a first cryptogram digital signed to prove the terms of agreement to the first transaction information to which the first condition information is added and the first transaction information to which the first condition information is added from the terminal 10 of the first user.

According to some embodiments, the memory 1320 may include at least one type storage medium of a flash memory type, a hard disk type, a multimedia card micro type, a card type memory (e.g., SD or XD memory, etc.), random access memory (RAM), static random access memory (SRAM), read only memory (ROM), electrically erasable programmable read-only memory (EEPROM), programmable read-only memory (PROM), a magnetic memory, a magnetic disk, or an optical disk. The memory 1320 may store at least one program for executing a method of operating a node on a network of a first blockchain that distributes and manages a ledger that records transactions of a first cryptocurrency on a computer. The at least one program stored in the memory 1320 may be classified into a plurality of modules according to functions.

According to some embodiments, the processor 1330 may control the overall operation of an electronic device, and may include at least one processor such as a CPU. The processor 1330 may include at least one specialized processor corresponding to each function, or may be a processor integrated into one.

The processor 1330 may execute a program stored in the memory 1320, read data or a file stored in the memory 1320, or store a new file in the memory 1320. Also, the processor 1330 may execute instructions stored in the memory 1320.

According to some embodiments, the processor 1330 may verify the validity of the first transaction information. If the first transaction information is valid, the processor 1330 may transmit the first transaction information to a second node on the network of the first blockchain through the communication device 1310. The processor 1330 may add the first transaction information to a candidate block.

According to some embodiments, the processor 1330 may perform proof of work on the candidate block, and add the candidate block to the first blockchain as a first valid block.

If the first condition information is satisfied, the processor 1330 may activate the first transaction. Here, the first condition information may be condition information for activating the first transaction according to the first transaction information recorded in a block connected to the first blockchain if a block recording the second transaction information is added to the second blockchain as the valid block.

According to some embodiments, the processor 1330 may determine whether the first condition information is satisfied with reference to a hash value of the second transaction information based on the second blockchain in the first transaction information recorded in a first block of the first blockchain. As a result of referring to the hash value of the second transaction information, if the second transaction information is recorded in the second blockchain, the processor 1330 may activate the first transaction. If the second transaction information is not recorded in the second blockchain, the processor 1330 may deactivate the first transaction.

The device described above may be realized as hardware elements, software elements, and/or the combination of hardware elements and software elements. For example, the device and the components described in the embodiments may be realized by using, for example, a processor, an arithmetic logic unit (ALU), a digital signal processor, a microcomputer, a field programmable gate array (FPGA), a programmable logic unit (PLU), a microprocessor, or one or more general-purpose computers or special-purpose computers, such as a device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, although the embodiments have been described by the limited embodiment and drawings, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A method of transaction between a first cryptocurrency transacted based on a first blockchain and a second cryptocurrency transacted based on a second blockchain, the method comprising:
   obtaining first transaction information with respect to first basic transaction information in which the first cryptocurrency is transmitted from an account of a first user to an account of a second user, and second transaction information with respect to second basic transaction information accompanying the first basic transaction information and in which the second cryptocurrency is received from the account of the second user to the account of the first user account;
   in response to the first transaction information satisfies terms of agreement between the first user and the second user, adding first condition information to the first transaction information, the first condition information depending on validity of the second transaction information and activating the first basic transaction information of the first cryptocurrency;
   in response to the second transaction information satisfies terms of agreement between the first user and the second user, adding second condition information to the second transaction information, the second condition information depending on validity of the first transaction information and activating the second basic transaction information of the second cryptocurrency; and
   digitally signing the first transaction information having (i) the first basic transaction information and (ii) the first condition information, to prove the terms of agreement, and transmitting the first transaction information to a node on a network of the first blockchain and the second transaction information having (i) the second basic transaction information and (ii) the second condition information, to prove the terms of agreement, and transmitting the second transaction information to a node on a network of the second blockchain,
   wherein the digitally signing of the first transaction information having (i) the first basic transaction information and (ii) the first condition information, to prove the terms of agreement, and transmitting of the first transaction information to the node on the network of the first blockchain and the second transaction information having (i) the second basic transaction information and (ii) the second condition information, to prove the terms of agreement, and transmitting the second transaction information to a node on a network of the second blockchain, comprises:
   calculating a first hash value by applying a hash function to the first transaction information having (i) the first basic transaction information and (ii) the first condition information and a second hash value by applying a hash function to the second transaction information having (i) the second basic transaction information and (ii) the second condition information;
   generating a first cryptogram indicating a digital signature of the first transaction information by encrypting the first hash value using a private key of the first user and a private key of the second user and a second cryptogram indicating a digital signature of the second transaction information by encrypting the second hash value using a private key of the first user and a private key of the second user; and
   transmitting, to the node on the network of the first blockchain, first integration transaction information including (i) the first cryptogram and (ii) the first transaction information, the first transaction information having the first basic transaction information and the first condition information and to the node on the network of the second blockchain, second integration transaction information including (i) the second cryptogram and (ii) the second transaction information, the second transaction information having the second basic transaction information and the second condition information.

2. The method of claim 1, wherein the first condition information is condition information for activating the first transaction according to the first transaction information recorded on a block connected to the first blockchain, if a block recording the second transaction information is added to the second blockchain as a valid block.

3. The method of claim 1, wherein the first condition information comprises at least one of
   condition information for invalidating the first transaction if the second transaction information is transmitted to a terminal of the second user, and, after a predetermined period of time, a block recording the second transaction information is not added to the second blockchain as a valid block; and
   condition information for deactivating the first transaction until the block recording the second transaction information is added to the second blockchain as the valid block.

4. The method of claim 1, further comprising:
   transmitting the first cryptocurrency from an electronic wallet of the first user to an electronic wallet of the second user, according to the first transaction information; and
   transmitting, to the terminal of the second user, a public key of the first user which is required when the second user requests payment of the first cryptocurrency.

5. The method of claim 1, further comprising:
receiving, from the terminal of the second user, a public key of the second user which is required when the account of the first user requests payment of the second cryptocurrency according to the second transaction information; and
when verification of the first transaction in the network of the first blockchain and verification of the second transaction in the network of the second blockchain are completed, receiving the second cryptocurrency using the public key of the second user.

6. The method of claim 1, wherein each of the first transaction information and the second transaction information comprises information about at least one of an address of an electronic wallet of a recipient to receive a predetermined cryptocurrency, an address of an electronic wallet of a transmitter to transmit the predetermined cryptocurrency, a transfer amount of the predetermined cryptocurrency, and a fee for transfer of the predetermined cryptocurrency.

7. The method of claim 1, further comprising:
determining whether the first transaction of the first cryptocurrency and the second transaction of the second cryptocurrency are suitable based on a predetermined exchange ratio of the first cryptocurrency and the second cryptocurrency; and
if the first transaction and the second transaction are not suitable, correcting a transfer amount of the first cryptocurrency or a transfer amount of the second cryptocurrency based on the predetermined exchange ratio of the first cryptocurrency and the second cryptocurrency.

8. The method of claim 1, further comprising:
transmitting the second transaction information with respect to the second transaction accompanying the first transaction to the terminal of the second user.

9. A non-transitory computer-readable recording medium having recorded thereon a program for executing the method of claim 1 on a computer.

10. A terminal comprising:
a communication device;
a processor;
a user interface device; and
a memory storing instructions executable by the processor, wherein the processor is configured to, by executing the instructions,
obtain first transaction information with respect to a first basic transaction information in which a first cryptocurrency is transmitted from an account of a first user to an account of a second user, and second transaction information with respect to second basic transaction information accompanying the first basic transaction information and in which a second cryptocurrency is received from the account of the second user to the account of the first user account;
in response to the first transaction information satisfies terms of agreement between the first user and the second user, add, to the first transaction information, first condition information depending on validity of the second transaction information and activating the first basic transaction information of the first cryptocurrency;
in response to the second transaction information satisfies terms of agreement between the first user and the second user, adding second condition information to the second transaction information, the second condition information depending on validity of the first transaction information and activating the second basic transaction information of the second cryptocurrency; and
digitally sign the first transaction information having (i) the first basic transaction information and (ii) the first condition information, to prove terms of agreement, and transmit the first transaction information to a node on a network of a first blockchain and the second transaction information having (i) the second basic transaction information and (ii) the second condition information, to prove the terms of agreement, and transmitting the second transaction information to a node on a network of the second blockchain,
wherein digitally signing of the first transaction information having (i) the first basic transaction information and (ii) the first condition information, to prove the terms of agreement, and transmitting of the first transaction information to the node on the network of the first blockchain and the second transaction information having (i) the second basic transaction information and (ii) the second condition information, to prove the terms of agreement, and transmitting the second transaction information to a node on a network of the second blockchain, comprises:
calculating a first hash value by applying a hash function to the first transaction information having (i) the first basic transaction information and (ii) the first condition information and a second hash value by applying a hash function to the second transaction information having (i) the second basic transaction information and (ii) the second condition information;
generating a first cryptogram indicating a digital signature of the first transaction information by encrypting the first hash value using a private key of the first user and a private key of the second user and a second cryptogram indicating a digital signature of the second transaction information by encrypting the second hash value using a private key of the first user and a private key of the second user; and
transmitting, to the node on the network of the first blockchain, integration transaction information including (i) the first cryptogram and (ii) the first transaction information, the first transaction information having the first basic transaction information and the first condition information and to the node on the network of the second blockchain, second integration transaction information including (i) the second cryptogram and (ii) the second transaction information, the second transaction information having the second basic transaction information and the second condition information.

11. The terminal of claim 10, wherein the first condition information is condition information for activating the first transaction according to the first transaction information recorded on a block connected to the first blockchain, if a block recording the second transaction information is added to the second blockchain as a valid block.

12. The terminal of claim 10, wherein the processor is further configured to, by executing the instructions,
receive, from the terminal of the second user through the communication device, a public key of the second user which is required when the first user requests payment of the second cryptocurrency according to the second transaction information; and
when verification of the first transaction in the network of the first blockchain and verification of the second transaction in the network of the second blockchain are completed, receive the second cryptocurrency using the public key of the second user.

13. The terminal of claim 10, wherein the processor is further configured to, by executing the instructions,
- determine whether the first transaction of the first cryptocurrency and the second transaction of the second cryptocurrency are suitable based on a predetermined exchange ratio of the first cryptocurrency and the second cryptocurrency and display a result of the determining through the user interface device; and
- if the first transaction and the second transaction are not suitable, correct a transfer amount of the first cryptocurrency or a transfer amount of the second cryptocurrency based on the predetermined exchange ratio of the first cryptocurrency and the second cryptocurrency and display a result of the correcting through the user interface device.

* * * * *